US009921812B2

(12) United States Patent
Childs et al.

(10) Patent No.: US 9,921,812 B2
(45) Date of Patent: *Mar. 20, 2018

(54) GUI-DRIVEN SYMBOL MANAGEMENT AND CODE GENERATOR

(71) Applicant: International Business Machines Corporation, Armonk, NY (US)

(72) Inventors: Bryan C. Childs, Poughkeepsie, NY (US); Peter J. Relson, Ulster Park, NY (US); Peter G. Spera, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,404

(22) Filed: Apr. 14, 2016

(65) Prior Publication Data

US 2017/0123763 A1 May 4, 2017

Related U.S. Application Data

(63) Continuation of application No. 14/979,758, filed on Dec. 28, 2015, now Pat. No. 9,430,194, which is a
(Continued)

(51) Int. Cl.
*G06F 9/44* (2006.01)
(52) U.S. Cl.
CPC ..................... *G06F 8/34* (2013.01)
(58) Field of Classification Search
CPC ........................ G06F 8/30; G06F 8/33–8/34
(Continued)

(56) References Cited

U.S. PATENT DOCUMENTS 5,966,532 A 10/1999 McDonald et al.
6,055,369 A 4/2000 Sawahata et al.
(Continued)

FOREIGN PATENT DOCUMENTS

WO 9806033 A1 2/1998

OTHER PUBLICATIONS

Novak, Daniela, "An Introduction to the Enterprise JavaBeans technology and Integrated Development Environments for implementing EJB applications", Vienna University of Economics and Business Administration, 2006, pp. 1-129.
(Continued)

*Primary Examiner* — Francisco Aponte
(74) *Attorney, Agent, or Firm* — Brian M. Restauro

(57) ABSTRACT

Embodiments of the present invention provide methods, program products, and systems for modifying source code by managing symbols indicating executable instructions. Embodiments of the present invention can be used to receive one or more symbols indicating executable instructions to be implemented via source code and generate a visual display comprising a dialog box supporting modification of source code that implements the executable instructions indicated by the one or more symbols. Responsive to receiving a user interaction with the dialog box resulting in modified source code, embodiments of the present invention can be used to generate modified source code or a representation of the modified source code that is shorter than the modified source code.

1 Claim, 15 Drawing Sheets

Related U.S. Application Data continuation of application No. 14/927,542, filed on Oct. 30, 2015.

(58) Field of Classification Search
USPC .......................................... 717/106; 715/700
See application file for complete search history.

(56) References Cited

U.S. PATENT DOCUMENTS

| | | | |
|---|---|---|---|
| 6,263,339 B1* | 7/2001 | Hirsch | G06F 17/30607 |
| 6,314,559 B1* | 11/2001 | Sollich | G06F 8/33 |
| | | | 717/111 |
| 6,701,513 B1 | 3/2004 | Bailey | |
| 6,785,850 B2 | 8/2004 | Dzoba et al. | |
| 6,957,186 B1 | 10/2005 | Guheen et al. | |
| 7,331,042 B2 | 2/2008 | Kulp et al. | |
| 7,644,390 B2 | 1/2010 | Khodabandehloo et al. | |
| 7,861,178 B2 | 12/2010 | Lui et al. | |
| 8,010,951 B2 | 8/2011 | Kulp et al. | |
| 8,176,467 B2 | 5/2012 | Weng et al. | |
| 8,202,097 B1 | 6/2012 | Brittingham et al. | |
| 8,266,585 B2 | 9/2012 | Funto et al. | |
| 8,302,070 B2 | 10/2012 | Adams et al. | |
| 8,352,913 B2 | 1/2013 | Sakhare et al. | |
| 8,504,983 B1 | 8/2013 | Englehart et al. | |
| 8,549,489 B2 | 10/2013 | Ortscheid | |
| 8,561,016 B2* | 10/2013 | Berg | G06F 8/10 |
| | | | 717/104 |
| 8,640,091 B2 | 1/2014 | January et al. | |
| 8,694,953 B2 | 4/2014 | Khodabandehloo et al. | |
| 8,732,656 B2 | 5/2014 | Ahadian et al. | |
| 9,047,337 B2 | 6/2015 | Ahadian et al. | |
| 9,052,983 B2 | 6/2015 | Farchi et al. | |
| 9,207,931 B2 | 12/2015 | Fox et al. | |
| 9,218,166 B2 | 12/2015 | Ramanathan | |
| 9,239,708 B2* | 1/2016 | Tillmann | G06F 8/33 |
| 9,244,658 B2 | 1/2016 | Beckwith et al. | |
| 9,262,130 B2* | 2/2016 | Kizhakkevalappil | G06F 8/34 |
| 9,430,194 B1 | 8/2016 | Childs et al. | |
| 2002/0016953 A1 | 2/2002 | Sollich | |
| 2002/0184610 A1 | 12/2002 | Chong et al. | |
| 2003/0236925 A1 | 12/2003 | Balek et al. | |
| 2004/0031017 A1* | 2/2004 | Vaidyanathan | G06F 8/33 |
| | | | 717/110 |
| 2004/0153995 A1* | 8/2004 | Polonovski | G06F 8/20 |
| | | | 717/113 |
| 2006/0026559 A1* | 2/2006 | Gunturi | G06F 8/315 |
| | | | 717/110 |
| 2006/0064676 A1 | 3/2006 | Chavan | |
| 2006/0143570 A1 | 6/2006 | Washington et al. | |
| 2006/0150148 A1 | 7/2006 | Beckett et al. | |
| 2007/0038978 A1* | 2/2007 | Meijer | G06F 8/437 |
| | | | 717/106 |
| 2007/0044066 A1 | 2/2007 | Meijer et al. | |
| 2007/0094609 A1 | 4/2007 | Gilboa et al. | |
| 2007/0157191 A1 | 7/2007 | Seeger et al. | |
| 2008/0086701 A1* | 4/2008 | Stokes | G06F 3/0481 |
| | | | 715/808 |
| 2008/0229290 A1 | 9/2008 | Jones et al. | |
| 2008/0250325 A1 | 10/2008 | Feigenbaum et al. | |
| 2009/0070737 A1* | 3/2009 | Huang | G06F 8/71 |
| | | | 717/105 |
| 2009/0125877 A1* | 5/2009 | Kuzsma, Jr. | G06F 8/34 |
| | | | 717/105 |
| 2009/0125878 A1 | 5/2009 | Cullum et al. | |
| 2009/0154759 A1 | 6/2009 | Koskinen et al. | |
| 2009/0241089 A1* | 9/2009 | Ramamoorthy | G05B 19/0426 |
| | | | 717/105 |
| 2010/0037202 A1* | 2/2010 | Schubert | G06F 8/35 |
| | | | 717/105 |
| 2013/0167123 A1 | 6/2013 | Dura et al. | |
| 2013/0191809 A1 | 7/2013 | Lovitt | |
| 2014/0047409 A1 | 2/2014 | Yang et al. | |
| 2014/0149961 A1 | 5/2014 | Falk et al. | |
| 2015/0186117 A1 | 7/2015 | Azrieli et al. | |
| 2015/0234642 A1 | 8/2015 | Araya et al. | |
| 2015/0268937 A1 | 9/2015 | Chouinard et al. | |

OTHER PUBLICATIONS

Wielenga, Geertjan, "Java Editor", Beginning NetBeans IDS for Java Developers, Apress, 2015, Chapter 3, pp. 31-83.

Eclipse, "Mobile Tools for Java", pp. 1-3, Copyright © 2015 The Eclipse Foundation, <http://www.eclipse.org/proposals/mtj/>.

IBM, "Generation of Line Table Entries including Sub-Object Symbol Annotations during Code Generation", An IP.com Prior Art Database Technical Disclosure, Original Publication Date: Feb. 5, 2010, IP.com No. 000192874. IP.com Electronic Publication: Feb. 5, 2010, pp. 1-3, <http://ip.com/IPCOM/000192874>.

IBM et al., "Link Edit With Symbols From Different Code Pages", An IP.com Prior Art Database Technical Disclosure, Original Publication Date: Jan. 1, 1992, Original Disclosure Information: TDB n8 Jan. 1992 p. 290-292, IP.com No. 000108026, IP.com Electronic Publication: Mar. 22, 2005, pp. 1-4, <http://ip.com/IPCOM/000108026>.

IBM, "Method and Apparatus to Generate Model Editor based on Model Driven Approach", An IP.com Prior Art Database Technical Disclosure, Original Publication Date: Oct. 9, 2006, IP.com No. 000141536, IP.com Electronic Publication: Oct. 9, 2006, pp. 1-12, <http://ip.com/IPCOM/000141536>.

Childs et al., "GUI-Driven Symbol Management and Code Generator", U.S. Appl. No. 14/927,542, filed Oct. 30, 2015, pp. 1-40.

Childs et al., "GUI-Driven Symbol Management and Code Generator", U.S. Appl. No. 14/979,758, filed Dec. 28, 2015, pp. 1-44.

IBM Appendix P.: "List of IBM Patents or Patent Applications to be Treated as Related", Dated Nov. 1, 2016, 2 pages.

Childs et al., "GUI-Driven Symbol Management and Code Generator", U.S. Appl. No. 15/413,541, filed Jan. 24, 2017, pp. 1-41.

IBM Appendix P.: "List of IBM Patents or Patent Applications to be Treated as Related", Dated Jan. 24, 2017, 2 pages.

* cited by examiner

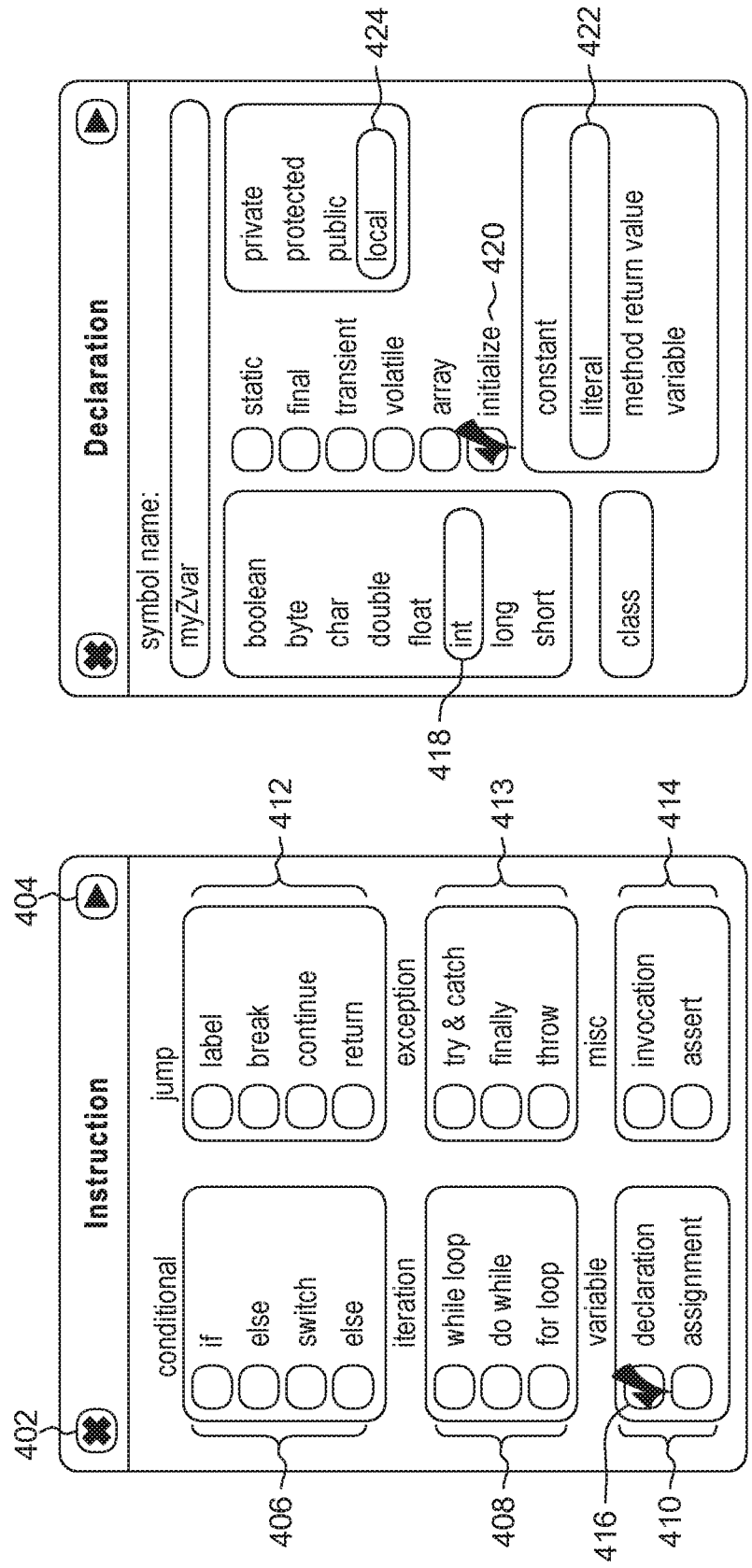

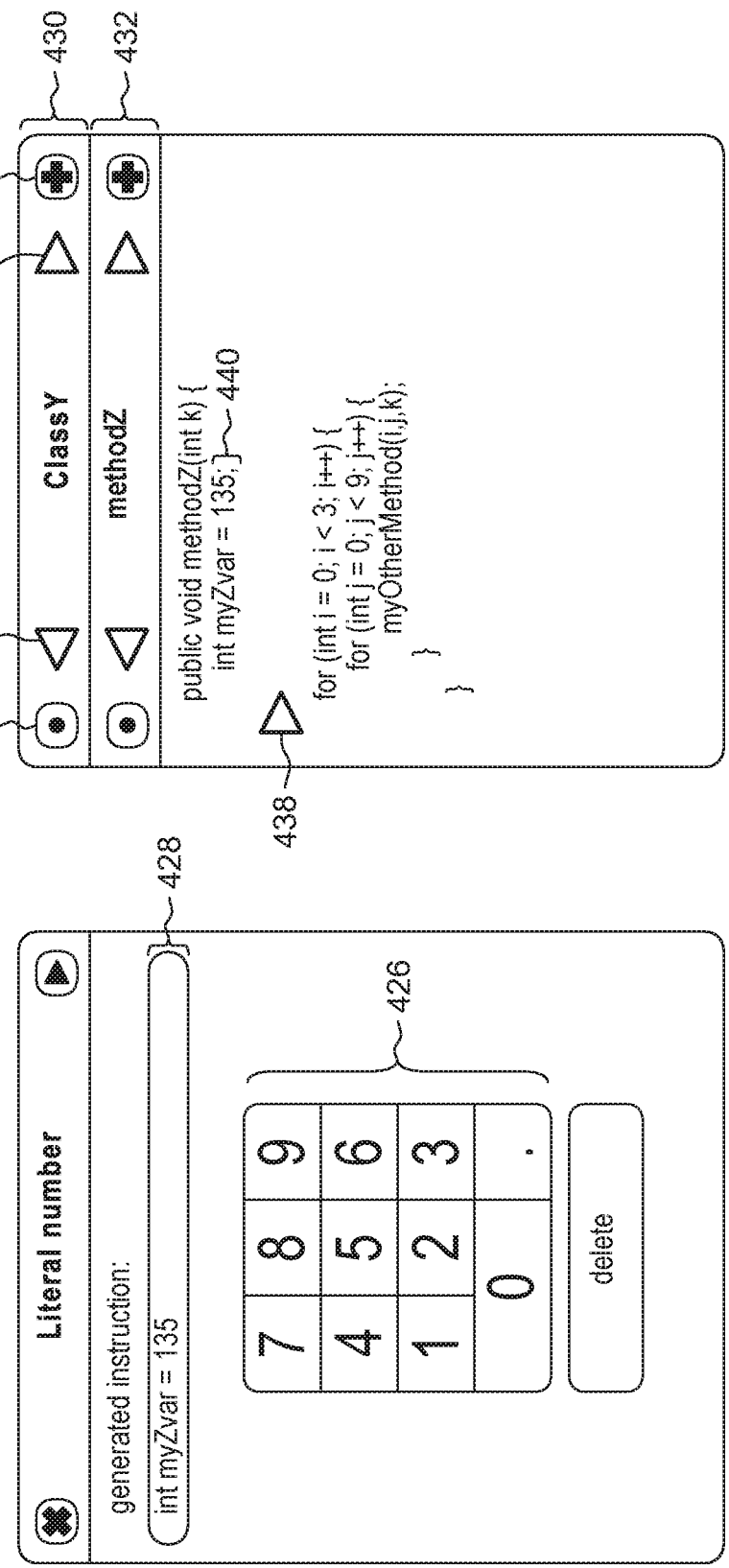

FIG. 5E

| order | expression | operator | |
|---|---|---|---|
| Combined expression | | | |
| 1 | myYvar.methodW4() <=7 | && | |
| 1 | i>5 | && | |
| 1 | i<2 | && | |
| 1 | j=3 | && | |
| 1 | j=5 | && | |
| 1 | j=7 | && | |
| 1 | myZvar !=3 | && | |
| 1 | myZvar !=5 | && | |
| 1 | myZvar !=7 | && | |

FIG. 5F

| order | expression | operator |
|---|---|---|
| Combined expression | | |
| 1 | myYvar.methodW4() <=7 | && |
| 2 | i>5 | = |
| 2 | i<2 | && |
| 3 | j=3 | = |
| 3 | j=5 | = |
| 3 | j=7 | && |
| 4 | myZvar !=3 | && |
| 4 | myZvar !=5 | && |
| 5 | myZvar !=7 | |

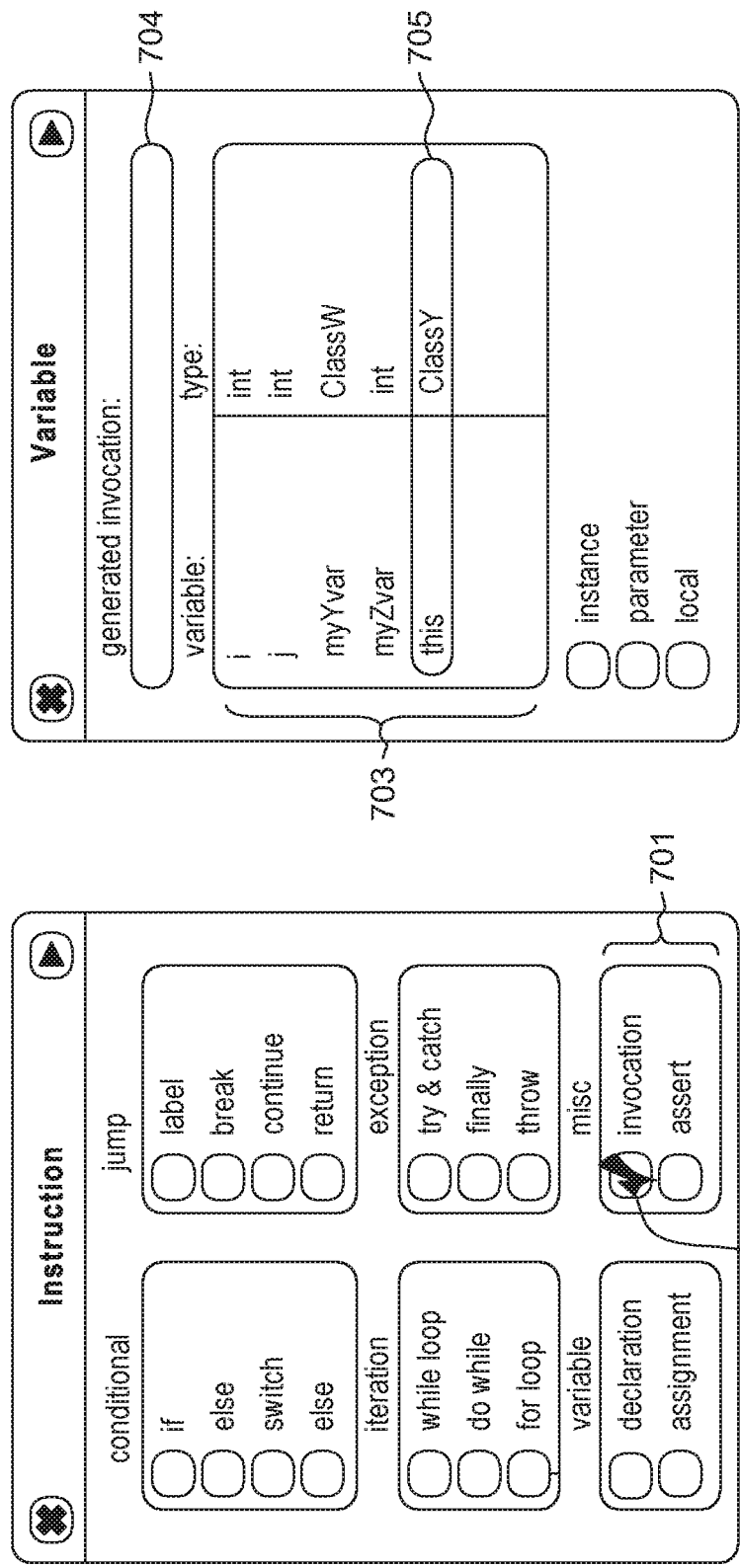

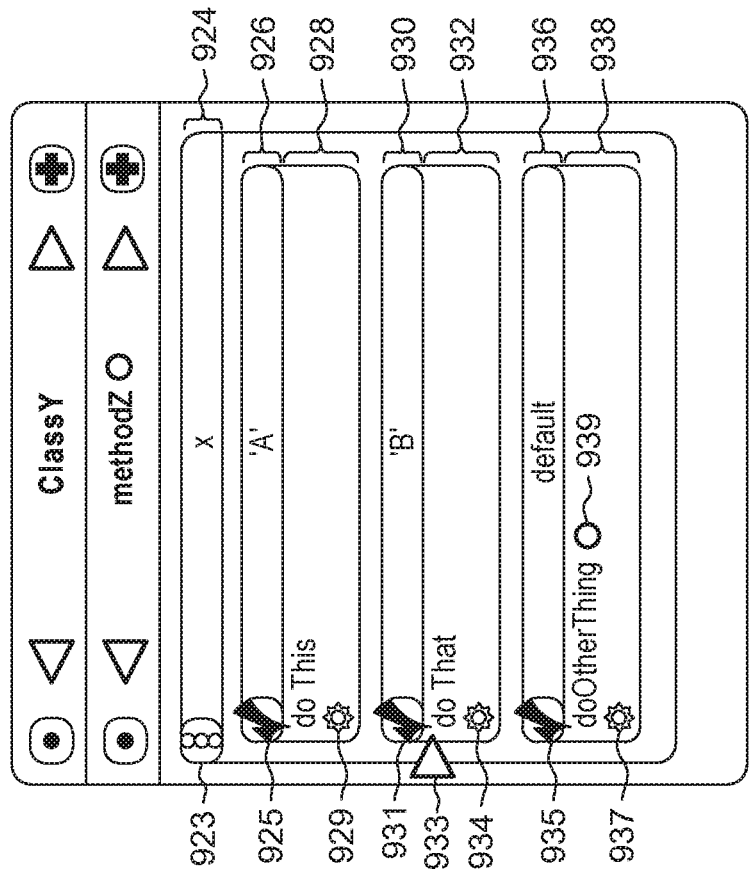
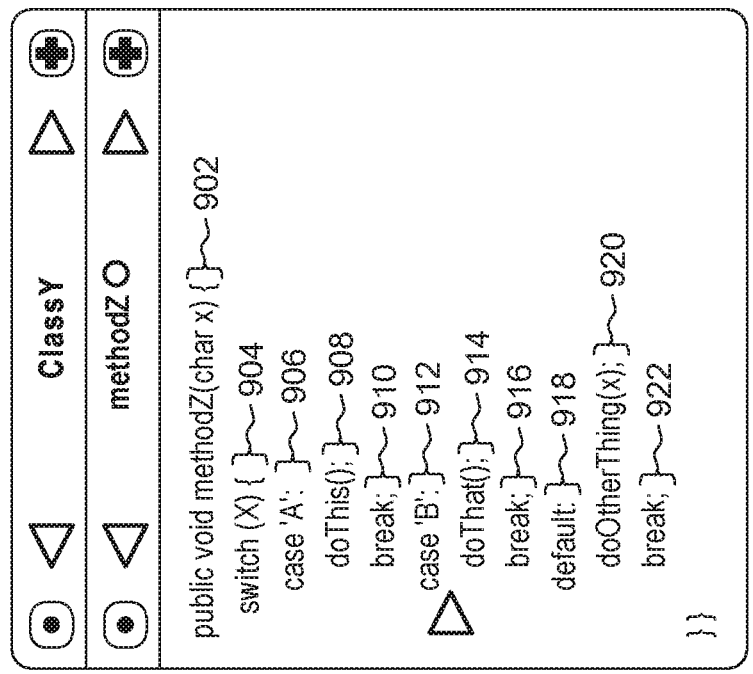
FIG. 9B
FIG. 9A

GUI-DRIVEN SYMBOL MANAGEMENT AND CODE GENERATOR

BACKGROUND

The present invention relates generally to the field of source code editors, and more particularly to GUI based structured editors.

Generally, a source code editor is a text based editor program used as a programming tool for editing source code. Source code editors may be standalone applications or may be built into an integrated development environment. Typically, source code editors have features such as syntax highlight, indentation, autocomplete, and bracket matching functionality.

SUMMARY

Embodiments of the present invention provide methods, program products, and systems for modifying source code by managing symbols indicating executable instructions. In one embodiment of the present invention a method is provided comprising: receiving one or more symbols indicating executable instructions to be implemented via source code; generating a visual display comprising a dialog box supporting modification of source code that implements the executable instructions indicated by the one or more symbols; and responsive to receiving a user interaction with the dialog box resulting in modified source code, generating a visual display comprising a dialog box output, wherein the dialog box output is one of the modified source code or a representation of the modified source code that is shorter than the modified source code.

BRIEF DESCRIPTION OF THE DRAWINGS

FIGS. 4A-4D are example screenshots of a visual display generated by a GUI structured editor on a mobile device, in accordance with an embodiment of the present invention;

FIGS. 5A-5F are example screenshots of a visual display generated by a GUI structured editor for on a mobile device, in accordance with an embodiment of the present invention;

FIGS. 7A-D are example screenshots of a user selection for method parameter scaffolding;

FIGS. 9A-9D are additional example screenshots of graphical icons that can be displayed using a GUI structured editor, in accordance with an embodiment of the present invention.

DETAILED DESCRIPTION

Figure 1:
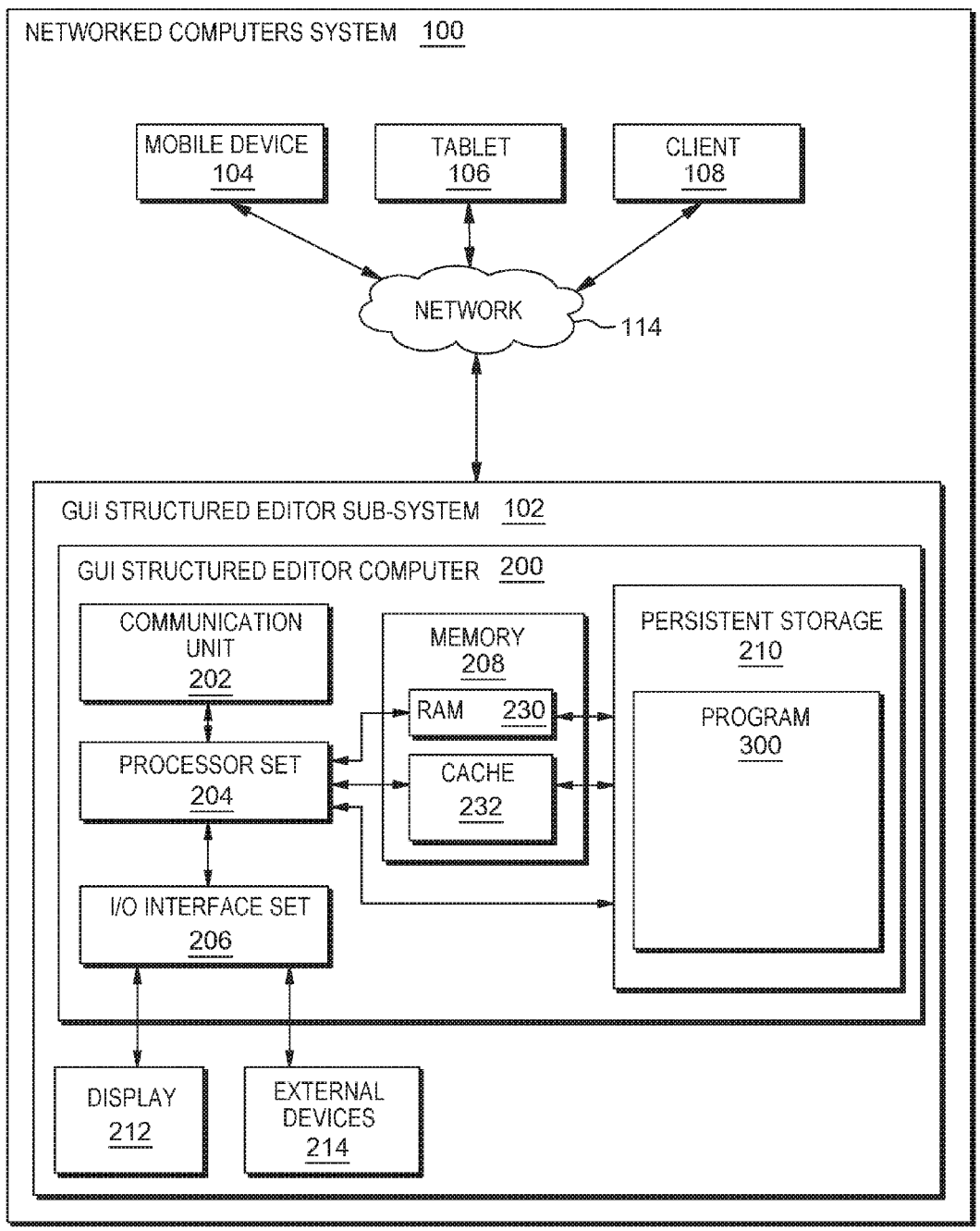
FIG. 1 is a block diagram view of a first embodiment of a system according to the present invention.

Embodiments of the present invention recognize that without a peripheral keyboard, editing source code (e.g., typing) is considerably slower and more error prone on mobile devices. In an object orientated language, user-defined symbols are used to name resources such as user-defined packages, classes, methods, parameters, fields, and constants. These symbols are combined together to form expressions and those expressions are used to form definitions and instructions that give them scope and context. Embodiments of the present invention provide solutions for modifying source code by managing these symbols. For example, responsive to user selections of these symbols, embodiments of the present invention can modify source code. In this manner, as discussed in greater detail in this specification, embodiments of the present invention can be used to minimize typing and enhance usability of source code editors. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: GUI structured editor sub-system 102; mobile device 104; tablet 106, client 106; GUI structured editor computer 200; communication unit 202; processor set 204; input/output (I/O) interface set 206; memory device 208; persistent storage device 210; display device 212; external device set 214; random access memory (RAM) devices 230; cache memory device 232; and program 300.

GUI structured editor sub-system 102 is, in many respects, representative of the various computer sub-system(s) in the present invention. Accordingly, several portions of GUI structured editor sub-system 102 will now be discussed in the following paragraphs.

GUI structured editor sub-system 102, mobile device 104, tablet 106, and client 108 can be a laptop computer, tablet computer, netbook computer, personal computer (PC), a desktop computer, a personal digital assistant (PDA), a smart phone, or any programmable electronic device capable of communicating with the client sub-systems via network 114. In certain embodiments, GUI structured editor sub-system 102, mobile device 104, tablet 106, and client 108 represent computer systems utilizing clustered computers and components to act as a single pool of seamless resources when accessed through network 114. For example, such embodiments may be used in a data center, cloud computing, storage network (SAN), and network attached storage (NAS) applications. In certain embodiments, GUI structured editor sub-system 102, mobile device 104, tablet 106, and client 108, represent virtual machines. In general, GUI structured editor sub-system 102, mobile device 104, tablet 106, and client 108 are representative of any electronic devices, or combination of electronic devices, capable of executing machine-readable program instructions.

Program 300 is a collection of machine readable instructions and/or data that is used to create, manage and control certain software functions that will be discussed in detail, below, in the Example Embodiment sub-section of this Detailed Description section. For example, program 300 is a graphic user interface structured editor that can receive and manage one or more user-defined symbols indicating a function to be implemented via source code that guarantees syntax correctness and produces enhanced views and modifications of source code. For illustrative purposes, the following discussion is made with respect to program 300 being local to GUI structured editor computer 200. However, it should be understood that in other embodiments, program 300 may be local to one or more components of networked computers systems 100 (e.g., mobile device 104, tablet 106, client 108).

GUI structured editor sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

GUI structured editor sub-system 102 is shown as a block diagram with many double arrows. These double arrows (no separate reference numerals) represent a communications fabric, which provides communications between various components of GUI structured editor sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for GUI structured editor sub-system 102; and/or (ii) devices external to GUI structured editor sub-system 102 may be able to provide memory for GUI structured editor sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to GUI structured editor sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with GUI structured editor computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
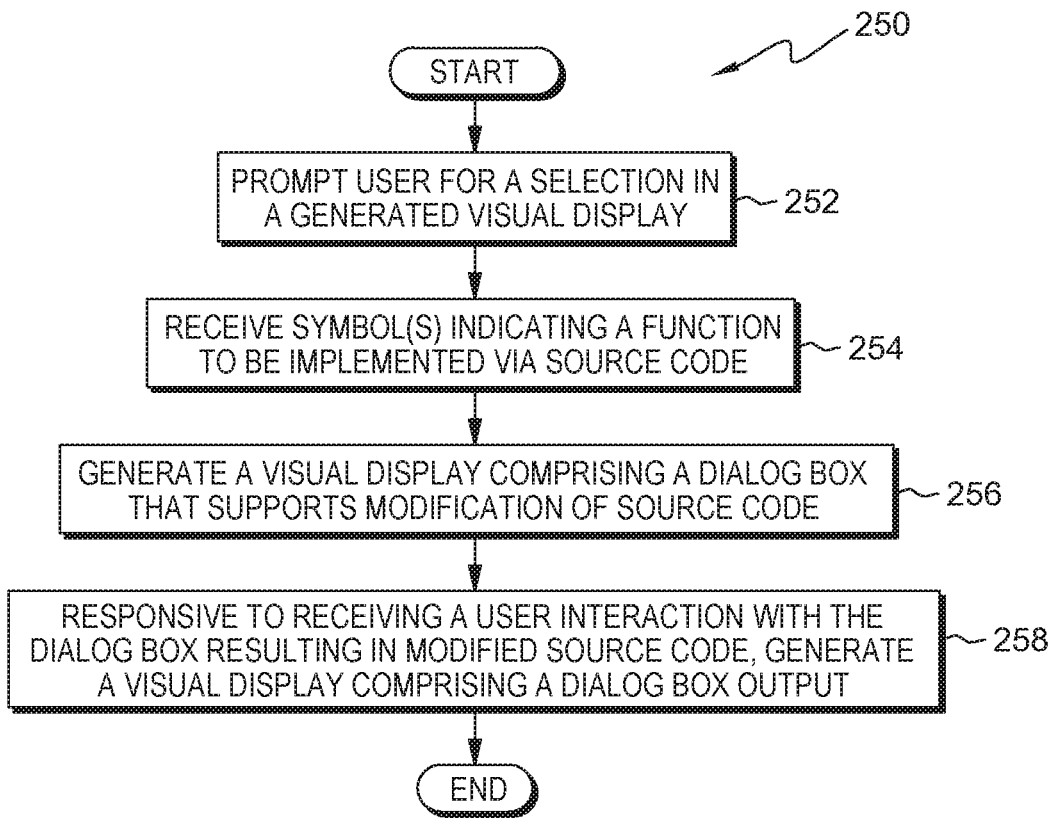
FIG. 2 is a flowchart showing a first embodiment method performed, at least in part, by the first embodiment system.
Figure 3:
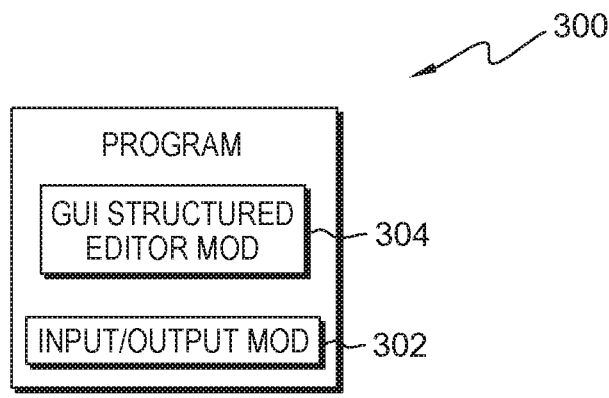
FIG. 3 is a block diagram showing a machine logic (for example, software) portion of the first embodiment system.

FIG. 2 shows a flowchart 250 depicting a method according to an embodiment of the present invention. FIG. 3 shows program 300 for performing at least some of the method operations of flowchart 250. This method and associated software will now be discussed over the course of the following paragraphs, with extensive reference to FIG. 2 (for the method operation blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

For illustrative purposes, the following example is discussed with respect to a GUI structured editor (e.g., program 300) modifying Java source code responsive to a user selecting user-defined symbols in a visual display (e.g., one or more dialog boxes). (Note: the term "JAVA" may be subject to trademark rights in various jurisdictions throughout the world and are used here only in reference to the products or services properly denominated by the marks to the extent that such trademark rights may exist.) However, it should be understood that the GUI structured editor can modify source code of any programming language.

Typically, the GUI structured editor displays a dialog box that has symbols and/or graphical icons that correspond to actual functional source code language (e.g., a swirl graphical icon denotes a conditional "for loop" in Java). In this example, responsive to a user selection, the GUI structured editor generates a visual display, comprising a dialog box that includes one or more symbols.

A "selection", as used herein, refers to any input from selectable elements in a generated visual display. For example, when generating new source code, a selection can be of one or more symbols (e.g., graphical icons) representative of data and instructions for a programming language. In this embodiment, a user can select a selectable element on a touch screen display. For example, a user may select a selectable element using his or her finger. In other embodiments, a user can select a selectable element by clicking on a selectable element (via a mouse). In yet other embodiments, a user can navigate selectable elements using arrow keys and select selectable elements by pressing the "enter" button of a keyboard.

A "symbol", as used herein, represents a selectable element (e.g., a graphical icon) that is representative of tasks for a programming language. A task, can be any action to be implemented by source code and performed by a computer. For example, a task can be to change a font color which is implemented by source code to implement the change to the font color. In some instances, a symbol may be a graphical icon (e.g., a graphic swirl) that represents instructions of a programming language (e.g., a conditional "for loop"). In other instances, a symbol may be a graphical icon created by a user that denotes an addition of a variable, an object within a method of a class, an available method of the object with one or more parameters that matches the characteristics of the type of selected method signature, etc. consistent with a programming language. Responsive to receiving symbols selected by a user, GUI structured editor mod 304 can ensure that the generated instruction is syntactically correct and associated symbols have correct definitions within the scope of the code before the instruction is "committed" to the program overall and to its associated view. For example, in instances where a variable is deleted, GUI structured editor mod 304 can prompt the user by displaying a series of dialog boxes on lines that would need to be adjusted before a deletion can be committed. Where a change in a symbol name (e.g., for a variable) has been selected and modified, GUI structured editor mod 304 can automate that change through all affected sources within view.

In the context of modifying existing code, a selection can be of one or more graphical icons (e.g., a cursor) that correspond to a line of code to be modified. For example, a graphical icon that resembles a triangle can denote a cursor. The cursor indicates a position within code (e.g., the line of code that a user is editing). Responsive to receiving a user selection (e.g., double clicking the triangle icon) of the cursor, the GUI structured editor can pop up the display box which has the graphical icons to add/modify/delete a new or existing symbol (e.g., to create a new variable within a selected method of a certain class).

Where existing user-defined symbols are present (e.g., for existing source code), GUI structured editor mod 304 can generate dialog boxes compliant with the parameters of existing user defined symbols. For example, GUI structured editor mod 304 can display a dialog box for the choice of parameters (e.g., i, j, k) for a method that is invoked (e.g., "myOtherMethod").

In this embodiment, graphical icons representing "add-after", add-before", "change", and "delete current" can be used to change the position of a cursor that determines the line of code in focus. In this embodiment, a button marked with a "+" sign can be selected to display a menu of extra options such as "add", "change", or "remove a new class or method". A button marked with a "dot" can be used to minimize the menu of extra options. For examples of other symbols, graphical icons, and selections, see the Further Comments and/or Embodiments sub-section of this Detailed Description.

In this example, a user has scrolled through existing source code and has selected (via a graphical icon denoting a cursor) to modify a method (e.g., method Z) within a class (e.g., class Y). In particular, the user utilizes visual display dialog boxes generated by program 300 to create a user defined symbol (e.g., myZvar) and input an instruction (e.g., "int myZvar=135") in existing source code by selecting one or more symbols and/or graphical icons displayed in the generated visual display dialog boxes until all possible parameters (i.e., selections consistent with an instruction) have been exhausted.

Processing begins at operation 252, where GUI structured editor mod 304 prompts a user to make a selection in a generated visual display. In this example, GUI structured editor mod 304 prompts the user to make a selection in a generated visual display by presenting a user with one or more symbols. For example, where there is no existing source code, GUI structured editor mod 304 can display a symbol (e.g., a graphical icon) that denotes a cursor that may be selected. Where existing source code needs to be modified, GUI structured editor mod 304 can display the existing source code and the symbol that denotes a cursor, which, when selected, can trigger a display of a dialog box comprising more symbols to modify the existing source code. In this example, a user has selected (via a cursor) to modify method Z within Class Y.

Processing proceeds at operation 254, where input/output mod 302 receives one or more symbols indicating a function to be implemented via source code. Continuing the above example, input/output mod 302 receives one or more symbols selected by the user to modify method Z within Class Y. In other instances, input/output mod 304 can receive one or more other symbols from a user selection (e.g., can receive a symbol created by a user, a symbol to be modified, etc.).

Processing proceeds to operation 256, where GUI structured editor mod 304 generates a visual display comprising one or more dialog boxes that supports modification of source code. In other words, GUI structured editor mod 304 generates dialog boxes having one or more graphical icons, responsive to receiving user selections of the one or more symbols.

In this example, responsive to a user selection (via a cursor) to modify method Z within Class Y, GUI structured editor mod 304 displays a visual display comprising an instruction dialog box that prompts the user for a selection of options displayed in an instruction dialog box. In this example, the instruction dialog box includes the following options that are available for modifying method Z: conditional (e.g., if, else, switch, else); jump (e.g., label, break, continue, return, etc.); iteration (e.g., while loop, do while, for loop, etc.); exception (e.g., try &catch, finally, throw, etc.); variable (e.g., declaration, assignment, etc.); and miscellaneous (e.g., invocation, assert, etc.). For examples of other selections, see the Further Comments and/or Embodiments sub-section of this Detailed Description.

Continuing the example above, input/output mod 302 receives a user selection of a "declaration" as the instruction for method Z. In this example, the declaration dialog box can display options of symbols. For example, an option may be to select an existing symbol, which, in this example, is a variable along with other options unique to the selected symbol within method Z of class Y. In this example, a user has chosen to define a new symbol and name it "MyZVar".

Responsive to the user creation of the new symbol, GUI structured editor mod 304 can generate a dialog box comprising options that correspond to available properties for the created variable. For example, GUI structured editor mod 304 can generate a dialog box comprising options for fundamental variable types (e.g., Boolean, byte, char, double, float, int, long, short, etc.), other characteristics associated with the declaration (e.g., static, final, transient, volatile, array, initialize, etc.), and characteristics of data (e.g., private, protected, public, local, etc.).

In this example, a user has chosen the fundamental variable type "int", has chosen to "initialize", and has chosen that the data be "local". Responsive to receiving a user selection of "initialize", GUI structured editor mod 304 can display optional characteristics associated with the declaration (e.g., constant, literal, method return value, variable, etc.). In this example, the user has chosen "literal".

Responsive to receiving a user input of initializing a literal variable, GUI structured editor mod 304 can display a "literal number" dialog box. In this example, a user has selected the following numbers: 1, 3, and 5.

Processing proceeds to operation 258, where, responsive to receiving a user interaction with the dialog box resulting in modified source code, GUI structured editor mod 304 generates a visual display comprising a dialog box output when all options (e.g., selected symbols and/or graphical icons) have been selected.

A "dialog box output", as used herein, refers to a display of modified source code generated in response to user selections of the one or more symbols and/or graphical icons. In some instances, the display of modified source code can be the actual source code (e.g., Java source code). In other instances the display of modified source code can be a graphical representation of the modified source code that is shorter than the modified source code, as discussed in greater detail with regard to FIGS. 4-9.

Continuing the above example, responsive to a user selection of the number "135", GUI structured editor mod 304 can recognize that there are no other options available for the created variable (e.g., myZvar) within method Z of class Y. Responsive to recognizing that there are no other options available, GUI structured editor mod 304 can generate an instruction of "int myZvar=135" and generate two dialogue boxes for method Z and class Y, respectively which can show the modified source code in traditional text form or show a graphical representation of the modified source code that is shorter than the modified source code. Thus, embodiments of the present invention can, responsive to receiving one or more symbols and/or graphical icons from the generated dialog boxes, generate source code.

Accordingly, in this embodiment, user-defined symbols and management of these symbols and their respective supporting lines of code can be used to reduce errors in source code writing and editing. Specifically, by managing user-defined symbols and respective supporting lines of code through a GUI based structured editor (e.g., through a series of displayed dialogue boxes generated in response to user selections) provides a user with the ability to make incremental changes and maintain consistency in the addition, change, and deletion of both symbols and logic. By performing the operational steps of flowchart 200, embodiments of the present invention can generate source code that is syntactically correct based on user selections without having to use a keyboard.

In other embodiments of the present invention, GUI structured editor mod 304 can add code commentary, responsive to user input. For example, responsive to a user selecting a graphical icon (e.g., a button), GUI structured editor mod 304 can display formatting options for commentary a user can add to source code. Examples of formatting options that GUI structured editor mod 304 can display are: full comments included on the side, truncated comments to keep lines of code tighter together, or no commentary at all, as discussed in greater detail with regard to the Further Comments and/or embodiments subsection of this Detailed Description. GUI structured editor mod 304 can propagate commentary associated with a particular user-defined symbol across multiple methods/classes, etc. In other words, a user can utilize GUI structured editor mod 304 to update all views with a single update.

In another embodiment of the present invention, GUI structured editor mod 304 modifies displays of pseudocode, responsive to a user selection. For example, GUI structured editor mod 304 can modify a view of source code to collapse different levels of groups, such as nested loops. In other words, GUI structured editor mod 304 can alter a view of the source code to display headings of instructions without displaying the instructions themselves. In another example, GUI structured editor mod 304 can be used to generate code scaffolding, as discussed in greater detail, with regard to FIGS. 6A-6D in the Further Comments and/or Embodiments subsection of this Detailed Description.

III. Further Comments and/or Embodiments

Some embodiments of the present invention recognize the following facts, potential problems and/or potential areas for improvement with respect to the current state of the art: (i) use of a free-form editor is prone to introducing many compile-time errors; (ii) editing source code on mobile devices is slower and more error prone without the use of a peripheral keyboard; and/or (iii) the use of parenthesis in conditionals is often faulty and sometimes difficult to detect in code reviews.

Some embodiments of the present invention may include one, or more, of the following features, characteristics and/or advantages: (i) a GUI based structured editor that can unlock the potential of mobile programming by allowing users to select symbols that correspond to source code, where existing source code can be modified with fewer errors and increased efficiency; (ii) usage of symbolic names in the addition, change, or deletion of any line of code, which would be selected via a list box, which can be filtered by the scope and the context of the line where the symbols were to be used; (iii) capabilities to switch from a graphical representation of source code to the traditional view of a free-form text editor (in a read-only view to ensure that syntax correctness was maintained); (iv) retention of code commentary having no adverse effect on proper syntax of reserved or user-defined symbols; (v) code commentary that includes audio, image, and video commentary; (vi) user preferences to present commentary that can be displayed in block comments above code, truncated versions to the side of code, and/or even a view where the commentary isn't shown at all; (vii) providing consistency in the addition, change, and deletion of source code using both symbols and logic; (viii) providing the ability to make incremental changes with the guarantee of compile-time correctness; (ix) avoiding mental context switches of multiple compile-time errors; (x) programmers need not focus on syntax or the formatting of that syntax; (xi) the ability to manage screen real estate that would make it possible to provide Integrated Development Environments (IDEs) to mobile devices and/or to code anywhere in any programming language; and/or (xii) ability to track any dependencies of earlier usage regarding the user-defined symbols, data type, scope, and other attributes, and alerting the programmer of incompatibilities.

FIGS. 4A-4D are example screenshots of a visual display generated by a GUI structured editor on a mobile device, in accordance with an embodiment of the present invention. Specifically, FIGS. 4A-D depict an example flow to create a user-defined symbol, including its initialization. In this example, a user has selected (via a cursor) to modify existing source code of Method Z in Class Y. Responsive to the user selection, the GUI structured editor has displayed an instruction dialog box.

FIG. 4A is an example screenshot of an instruction dialog box that displays various options to construct code blocks, to control the flow around those blocks, to declare the associated data, and to manipulate that data.

Buttons 402 and 404 are for navigational purposes. For example, selecting button 402 may exit out of the GUI display while selecting button 404 advances the GUI display to a different screen.

The GUI structured editor can display option blocks associated with method Z. These option blocks include: blocks 406 that denote options for conditionals, 408 that denote options for iterations, 410 that denote options for variables, 412 that denote options for jumps, 413 that denotes options for exceptions, and 414 that denote options for miscellaneous. Options for block 406 include: if, else, switch, and else if. Options for block 408 include: while loop, do while, and for loop. Options for block 410 include declaration and assignment. Options for block 412, include: label, break, continue, and return. Options for block 414, include: try and catch, finally, and throw. Options for block 414 include: invocation and assert.

In this example, option 416 is selected by a user. Option 416 is a declaration of a variable. Button 404 is selected by a user and, responsive to that selection, the GUI structured editor displays a visual display of a declaration dialog box, as discussed in greater detail with regard to FIG. 4B.

FIG. 4B is an example screenshot of a declaration menu that is displayed responsive to a user-selected option 416. In this example, the GUI based structured editor prompts a user to select a previously designated user-defined symbol or create a new user-defined symbol for the chosen method (e.g., method Z). The GUI based structured editor also lists the primitive data types (e.g., Boolean, byte, char, double, float, int, long, and short) along with an object option (e.g., static, final, transient, volatile, array, initialize), variable attribute options (e.g., constant, literal, method return value, and variable), and the level of privacy (e.g., private, protected, public, and local).

In this example, the user has selected data type 418 which is "int". The user has further selected object option 420 (e.g., initialize). Responsive to a user selection of variable attribute option 420, the GUI structured editor can display variable attribute options (e.g., constant, literal, method return value, and variable). In this example, the user has selected variable attribute option 422, which is literal. Further the user has selected option 424, which is "local", for the level of privacy.

FIG. 4C is an example screenshot that is generated in response to a user selection. For example, responsive to receiving a user input of selected data type 418, object option 420, variable attribute option 422, and option 422, the GUI based structured editor displays a literal number dialog box.

In this example, the literal number dialog box includes number pad 426 and display box 428. The GUI structured editor can then receive user input (via number pad 426) to generate source code instruction that is displayed in display box 428. In this example, the user can input "135" using number pad 416. Accordingly, the GUI structured editor can display the following instruction in display box 418: "int myZvar=135".

FIG. 4D is an example screenshot of a possible source code view generated in response to user selections in FIGS. 4A-C. In this example, there are two dialog boxes 430 and 432. Buttons 434a and 434b are graphical icons used for scrolling through different menus within the respective dialog boxes. In this embodiment, buttons 434a and 434b are triangular shaped. In other embodiments, buttons 434a and 434b may be any combination of symbols and/or shapes. Selecting button 436a hides the extra option items. In this embodiment, button 434a is denoted by a dot while 436b is denoted by a "+" sign.

Dialog box 432 displays the current method being modified (e.g., method Z). In this example, a "myZvar" variable has just been added as a local variable and source code has been generated (e.g., int myZvar–135), responsive to the user selections made in FIGS. 4A-C. Button 438 is a highlighted triangle that denotes a position of the cursor in line with source code that is being modified. Responsive to a user selection of button 438 (e.g., via double-tapping a touch screen), the GUI structured editor can display a dialog box with options to add, change, or remove instructions.

Dialog box 430 displays the Class which the method is a part of (e.g., class Y). Selecting button 436b can switch views to display a different dialog. For example, selecting button 436b can display, dialog box 430. Conversely, selecting button 436a can hide dialog box 430 and display dialog box 432. In this example, dialog box 430 is minimized for display purposes. In another embodiment, where a larger screen is available, FIG. 4D can be presented as a split screen that can display both dialog boxes 430 and 432 at the same time.

Selecting buttons 434a and 434b can toggle between different views of the same dialog box. For example, selecting button 434b can display the next class in a sequence of classes of dialog box 430. Selecting button 434a can display the previous class in a sequence of classes of dialog box 430.

FIGS. 5A-5F are example screenshots of a visual display generated by a GUI structured editor for on a mobile device, in accordance with an embodiment of the present invention. Specifically, FIGS. 5A-F depict an example flow when a conditional for a given class (e.g., Class Y) is selected (e.g., if a conditional "if" is selected as a user input in FIG. 4A).

Figures 5A, 5B:
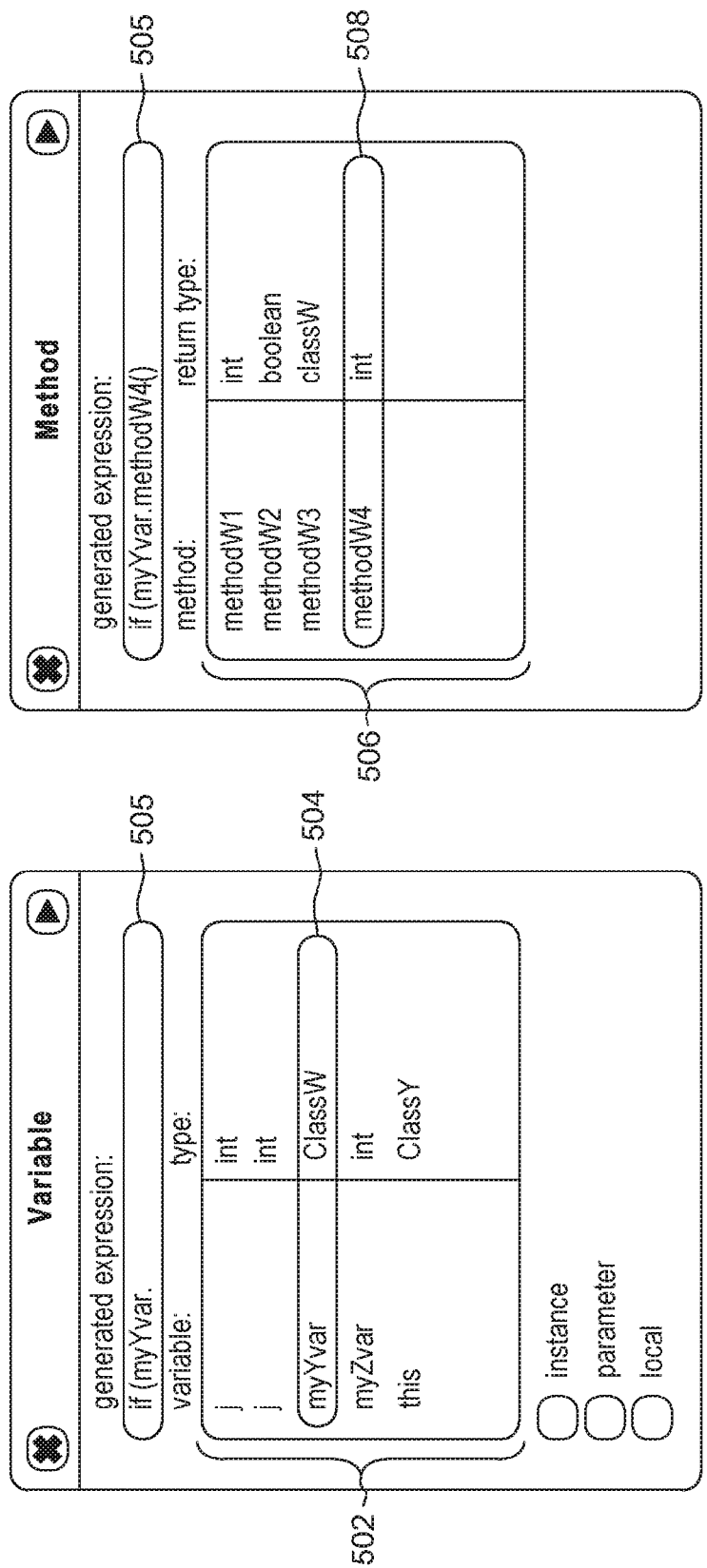

FIG. 5A is an example screenshot of a "variable" dialog box that was generated by the GUI structured editor in response to a user selection of a conditional, "if". In this screenshot, the variable dialog box displays list 502 and display box 505. List 502 includes variables in alphabetical order along with corresponding types. For example, list 502 displays variable "i" and its corresponding type "int"; variable "j" and its corresponding type "int"; variable "myYvar" and its corresponding type "ClassW"; and so on. List 502 can include local variables to the current method within view, parameters to that method, data within the class, and the reference to the current instance of that class. In this example, the user has made selection 504. Selection 504 includes the variable "myYvar" and its corresponding type "ClassW". Responsive to selecting selection 504, the GUI structured editor populates display 505 with the following source code instruction: if (myYvar.

FIG. 5B is an example screenshot generated in response to user selections of FIG. 5A (specifically, responsive to selection 504). In this example, the GUI structured editor displays a method dialog box. In this screenshot, the method dialog box displays list 506 and display box 505. List 506 includes methods and return types. In this example, the user has selected option 508 which includes "methodW4" and return type "int". Responsive to receiving the user selection of option 508, the GUI structured editor modifies the source code instruction to "if (myYvar.methodW4( )", which is displayed in display box 505.

Figures 5C, 5D:
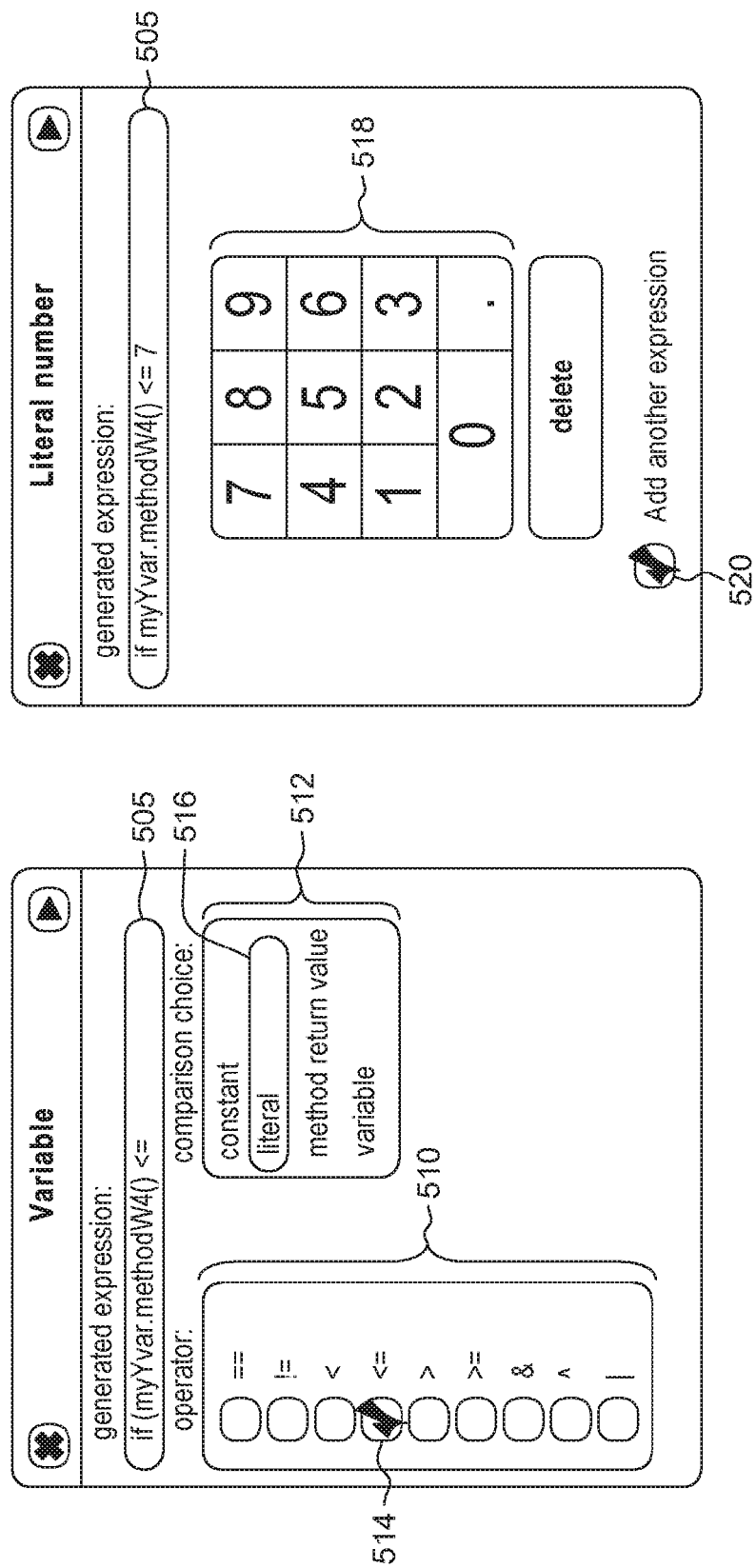

FIG. 5C is an example screenshot generated in response to user selections of FIG. 5B (specifically, responsive to the selection of option 508). In this example, the GUI structured editor displays an operator dialog box. The GUI structured editor displays options for a user to select the operator and follow-on comparison type along with display box 505.

For example, the GUI structured editor can display lists 510 and 512. In this example, list 510 displays one or more symbols to denote an "operator". In this example, list 510 displays the subset of available operators (e.g., ==, !=, <, <=, >, >=, &, ^, |, etc.). In other embodiments, the GUI structured editor could present all of the operators while creating a visual indication for operators that are not available. For example, the GUI structured editor can gray out operators that are unavailable to alert the user of unavailable operators.

List 512 displays comparison choices. In this embodiment, comparison choices can include: constant, literal, method return value, value, etc. In this example, the user has selected option 514 which is an operator denoted by the following symbol "<=" and option 516 which is "literal". Accordingly, the GUI structured editor updates display box 505, responsive to the user selections (e.g., option 514 and 516) to display the following instruction: if (myYvar.method4( )<=.

FIG. 5D is an example screenshot generated in response to user selections of FIG. 5C (specifically, responsive to the selections of options 514 and 516). In this example, the GUI structured editor displays a literal number dialog box responsive to receiving an input of a user selection of option 516.

In this example, the GUI structured editor displays number pad 518 and prompts the user for user input. In this example, user has selected the number "7" from number pad 518. The GUI structured editor can also display option 520 which is an option to add another expression. Accordingly, the GUI structured editor updates display box 505, responsive to the user selections (e.g., the number seven from received input of number pad 518) to display the following instruction: if (myYvar.method4( )<=7.

In this example, the user has selected option 520. A user can then repeat the steps taken in FIGS. 5A-C to add an additional expression. For example, the user could repeat the flow of dialog boxes in order to create a list of simple expressions, then subsequently combine them for one conditional.

FIG. 5E is an example screenshot generated responsive to user selections of FIG. 5D. In this example, the GUI structured editor displays a combined instruction (i.e., expression) dialog box. The GUI structured editor displays list 522, buttons 524*a-n*, and buttons 526*a-n*. List 522 includes all of the generated simple expressions which correspond to Java source code. Buttons 524*a-n* can be selected to change the order of the expression. For example, selecting the "+" button prioritizes an expression over another expression. Conversely, the "−" button deprioritizes an expression over another expression. Buttons 526*a-n* can be selected to change between types of operators (e.g., logical "and", logical "or", etc.).

FIG. 5F is an example screenshot generated in response to user selections. Specifically, FIG. 5F displays an example screenshot of a dialog box displayed, responsive to user selections of FIG. 5E. FIG. 5F provides an alternate view to further illustrate visual indications created by the GUI structured editor to show user-specified groupings and hierarchy of code.

In this embodiment, the GUI structured editor can use shading in addition to a numbered order as visual indications (e.g., using numbers and/or shading) to denote user-specified groupings instead of traditional parenthesis used to denote specified groupings (e.g., groups with one parenthesis are considered in the same group with groups with two parentheses are considered to be in a different group). In this example, a user has selected buttons 524*a-n* to indicate specified groupings and hierarchy of expressions and has selected buttons 526*a-n* to indicate different operators for the specified groupings. For example, responsive to user selections indicating order, the GUI structured editor displays five different blocks, blocks 528-536.

Block 528 has an order of "1" and contains the following expression: myYvar.method4( )=7. Block 530 has an order of "2" and contains the following expressions: i>5 and i<2. Block 532 has an order of "3" and contains the following expressions: j==3, j==5, and j==7. Block 534 has an order of "4" and contains the following expressions: myZvar!=3 and myZvar!=5. Block 536 has an order of "5" and contains the following expression: myZvar!=7.

Accordingly, embodiments of the present invention can be used to generate source code that is syntactically correct as well as a visual representation of the generated source code in a format that is easy to digest. As shown, by FIGS. 5A-F, the visual representation of code allows a user to easily distinguish between different groupings of expressions as opposed to the manually counting of parentheses that would otherwise indicate the groupings.

FIGS. 6A-D are screenshots of different views in a dialog box, in accordance with an embodiment of the present invention. In this embodiment, the GUI structured editor can generate a visual display of modified source code such that the representation of the modified source code is shorter than the source code responsive to one or more user selections. In this example, the GUI structured editor displays graphical icons that replaces keywords (e.g., conventional "for loop" and "if" conditions) associated with source code for method Z in a visual display (e.g., a dialog box). Responsive to receiving a user selection of the graphical icons, the GUI structured editor can display or hide more visual representations of source code.

Figure 6B:
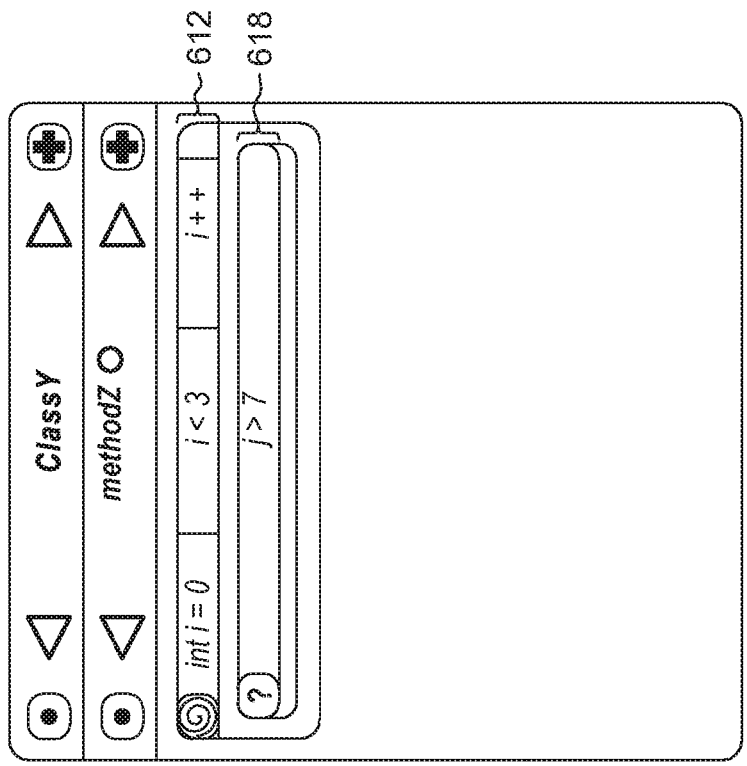
FIGS. 6A-D are screenshots of different views in a dialog box, in accordance with an embodiment of the present invention.
Figure 6A:
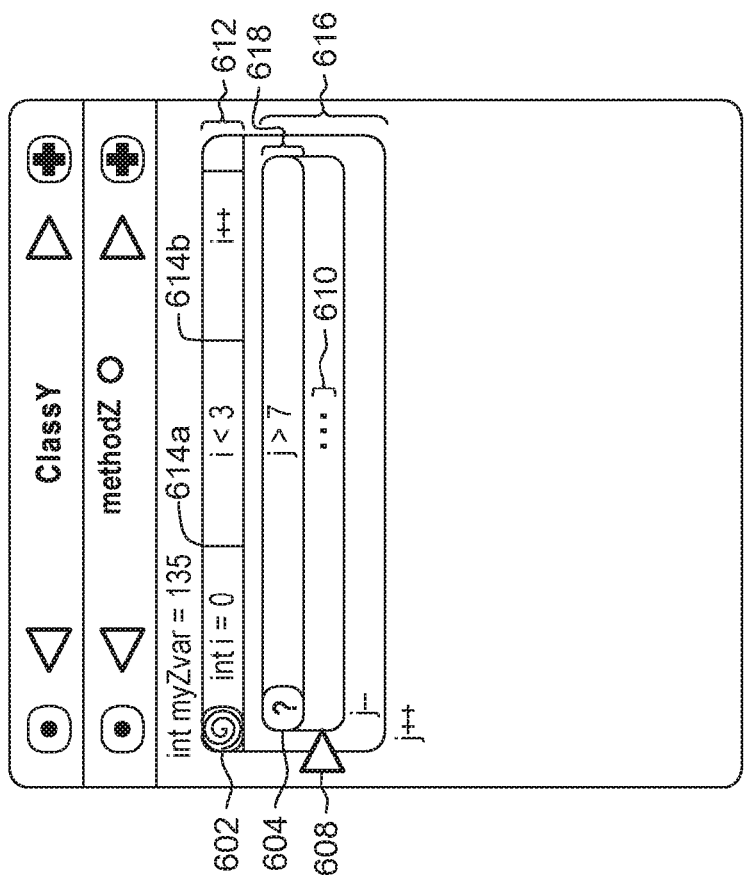

FIG. 6A is an example screenshot of a display wherein a user is presented options to make a selection. The GUI structured editor displays box 616 which includes header 612. Header 612 is a graphical representation of an instruction of source code and includes columns 614*a* and 614*b* and icon 602. In this example the columns 614a and 614b of header 612 replace semicolons used in source code. In this example, icon 602 is a graphical icon of a swirl that denotes a "for loop". Therefore, header 612 denotes the following source code: "for (int i: 0; i<3; i++){".

Nested within box 616 is header 618 which includes icon 604. Icon 604 is a graphical icon of a question mark that denotes an "if" condition. Header 616 is a visual representation of source code that corresponds to: "if j<7}. The placement of header 618 within box 616 indicates that the contents are likewise nested within the source code instruction represented by header 618.

Icon 608 is a graphical icon of a triangle that depicts the option of a cursor within the box 616 that indicates a position in lines of source code where modifications are made responsive to user selections. For example, responsive to receiving a user selection of icon 608, the GUI structured editor can display dialog boxes similar to the dialog boxes described in FIGS. 4A-D to add, modify, or delete source code.

Icon 610 is a graphical icon of an ellipses which is used to denote collapsed code within the group. Responsive to selecting icon 610, the GUI structured editor can display or collapse code. In this example, a user has selected icon 610.

FIG. 6B is an example screenshot displaying pseudocode responsive to receiving the user selection of FIG. 6A. In this embodiment, responsive to receiving a user input of icon 610, the GUI structured editor can switch views to hide the contents of box 616 (not shown), leaving only headers 612 and 618 as the display.

Figure 6D:
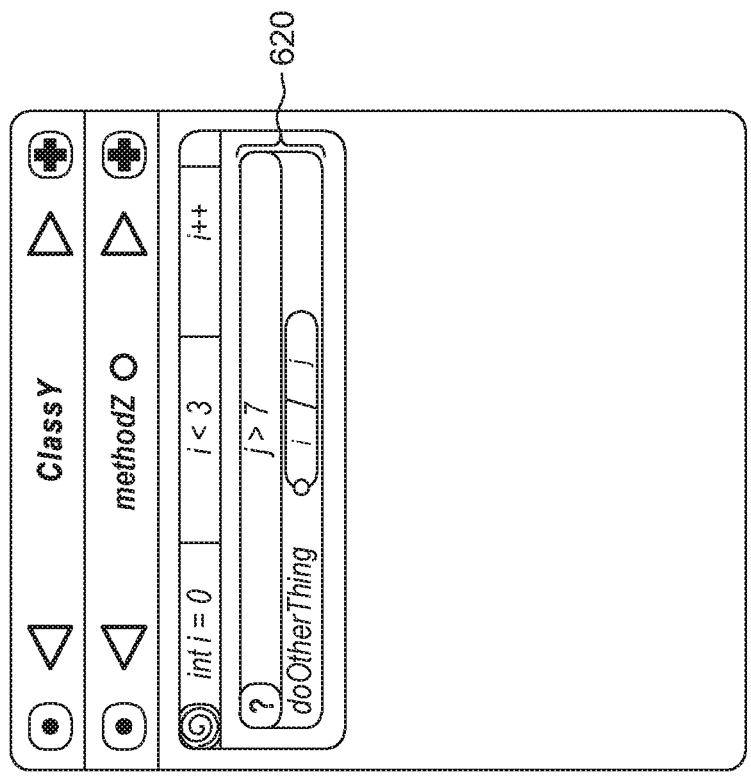
Figure 6C:
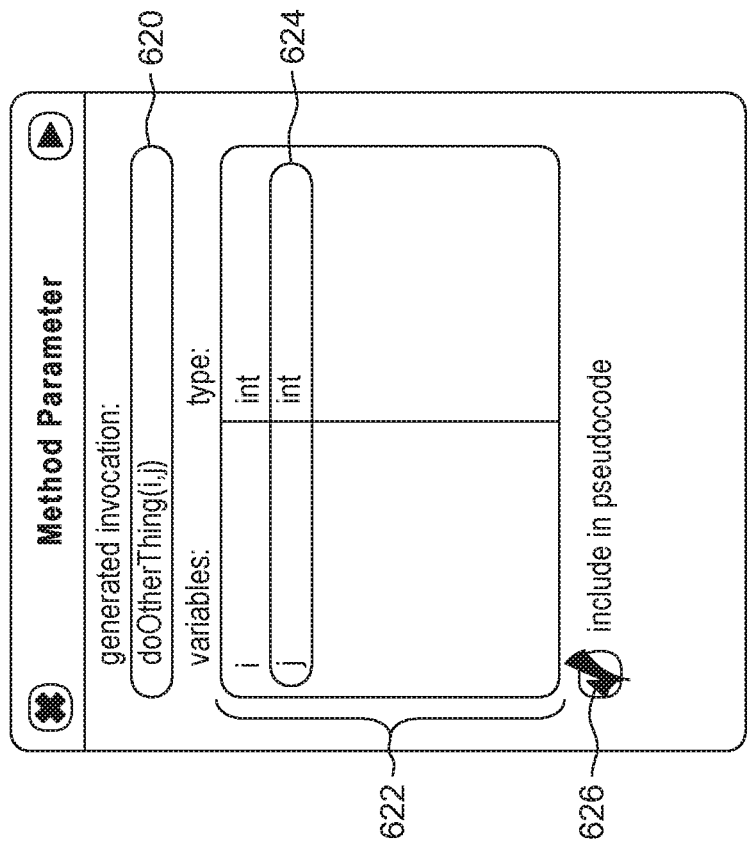

FIG. 6C is an example screenshot displaying visual representation of an invocation method and the alternate view that can be displayed responsive to a user selection. In this example, a user has selected an "invocation" as the instruction to modify in Method Z of Class Y.

In this example, the GUI structured editor (e.g., GUI structured editor mod 304) displays display box 620 and list 622. Display box 620 displays generated source code instructions, responsive to a user selection of list 622. List 622 displays options of existing variables (e.g., variable i and variable j) and their corresponding types (e.g., int) for a selected method. In this example, the user has selected option 624 which is variable "j" and corresponding type "int". Responsive to receiving a user selection of option 624, the GUI structured editor can display the following source code: doOtherThing(i,j).

The user has further selected option 626 which is a box that displays a check responsive to a user selection. Option 626 is an option to generate a visual display of pseudocode of the generated source code, as discussed in greater detail with respect to FIG. 6D.

FIG. 6D is an example screenshot displaying pseudocode. In this example, the pseudocode is identified in box 620 as "doOtherThing". In this embodiment, the visual indication given to pseudocode is a text bubble with a corresponding slanted line and italicized text which displays the parameter list of "doOtherThing".

Accordingly, responsive to receiving user selections, embodiments of the present invention, can generate and toggle between different views to expand or collapse blocks of source code (e.g., instructions within a particular method of a class). In essence, this embodiment can be used show pseudocode (i.e., an alternate view of source code).

FIGS. 7A-D are example screenshots of a user selection for method parameter scaffolding, in accordance with an embodiment of the present invention. In this example, a user has selected to modify method Z of class Y by generating functional code. However, the user has chosen not to input instructions for method Z.

FIG. 7A is an example screenshot of a GUI structured editor displaying an instruction dialog box similar to the instruction dialog box displayed in FIG. 4A. In this example however, a user has selected from option 701, which is the miscellaneous box. Specifically, the user has selected option 702, which represents an invocation.

FIG. 7B is an example screenshot of a GUI structured editor displaying a variable dialog box responsive to a user selection of Figure A. In this screenshot, the variable dialog box displays list 703 and display box 704. List 703 includes variables in alphabetical order along with corresponding types. For example, list 703 displays variable "i" and its corresponding type "int"; variable "j" and its corresponding type "int". In this example, the user has selected option 705 which includes "this" variable and "class Y" type. Display box 704 displays source code generated in response to receiving a user selection.

Figure 7D:
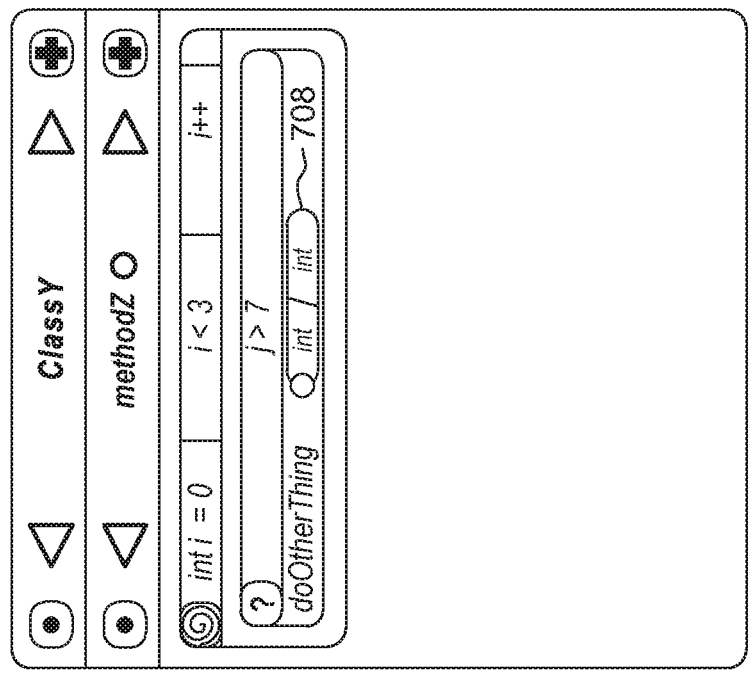
Figure 7C:
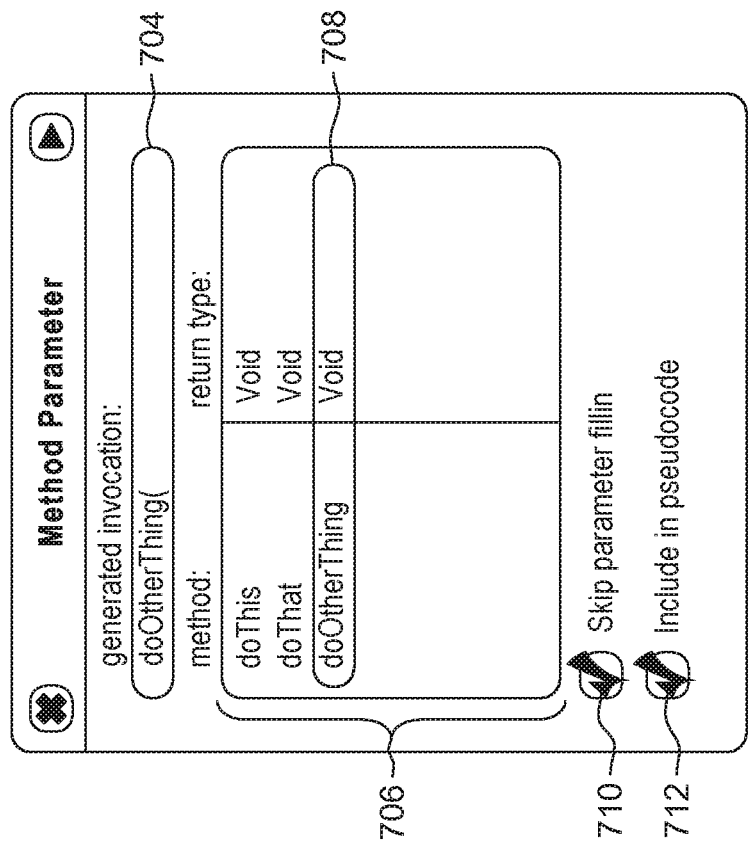

FIG. 7C is an example screenshot of a GUI structured editor displaying a method dialog box responsive to receiving a user selection of option 705 in FIG. 7B. In this example, the GUI structured editor displays a method dialog box. In this screenshot, the method dialog box displays list display box 704, list 706, options 710 and 712.

As previously discussed in FIG. 7B, display box displays source code generated in response to receiving a user selection. In this example, responsive to receiving a user selection of option 705, display box 704 displays a generated invocation "doOtherThing(".

List 706 includes methods and return types. In this example, the user has selected option 708 which includes the method "doOtherThing" and return type "void". Options 710 and 712 are view options that a user can select to alter views. For example, responsive to receiving a user selection of option 710, the GUI structured editor can skip parameter fill in. In other words, selecting option 710 allows a user to frame out blocks of code without having to input the specific parameters of an operation. Option 712 is a view option that, when selected, allows a user to alter a view (e.g., include the selection of option 708 as a pseudocode view).

FIG. 7D is an example screenshot that displays the user's selection to skip parameter fill-ins and display the pseudocode for method "doOtherThing". In this example, the GUI structured editor displays the pseudocode in text bubble 708 which can alert the user to fill in the parameters at a later time.

Accordingly, the GUI structured editor can incorporate pseudocode that allows a user the option to keep the context of code without emphasizing code flow. In other words, the GUI structured editor gives a user the option to generate the necessary scaffolding of method parameters without having to provide the parameters themselves. This pseudocode can be tracked by an integrated development environment which can then alert a user to provide the necessary detail to complete the methods.

In another embodiment, the GUI structured editor can store multiple versions of a mediation file which could facilitate the support of multiple versions that can be loaded based on user preference without creating a compiled listing first. A "mediation file", as used herein, refers to a file that stores changes in a given source code which can then be used to generate one or more previous versions of the source code (e.g., version 1, version 2, etc.).

In this embodiment, the GUI structured editor can store multiple versions of a mediation file by tracking addition, creation, modification, deletion, etc. of user-defined symbols and their contexts, compressed interpretations of the executable code, history records of time, user, and content. For example, variable "myZvar" is used in three different methods and has been modified twice. The GUI structured editor can access the mediation file to alert the user that variable myZvar is used in three different methods and has at least two different versions, versions A and B. Responsive to a user selection of version A, the GUI structured editor can load a view of version A.

Further, the GUI structured editor can optionally transfer multiple versions into the object code (granted, with an increased size to the executable code), where the link or even dynamic use of that code could be from selected versions. Thus, in certain embodiments of the present invention, the GUI structured editor can automate multi-pathing of versioned code at some preference level for number of versions supported. The end result permits the coexistence of both new and legacy environments to ensure application compatibility upstream.

In certain embodiments, the GUI structured editor can filter and display known changes to user-defined symbols to expedite reviews. Furthermore, dependencies could be coded into the mediation file, where a given function is linked to one or more external functions at specified levels. A user can add commentary using the GUI structured editor that would help diagnose issues early in later updates.

The GUI structured editor can leverage the stored deltas within the GUI driven mediation code to generate multi-pathed object code. Resulting load modules could support multiple versions of functionality at a granular level, including pending changes. For example, load modules could include change history of added, changed, and deleted lines of code (and could result in multi-pathed object code that could conditionally run at lower levels for compatibility).

In certain embodiments, the GUI structured editor alerts the file format to include additional data to provide the new functionality described above. Each instruction line and every user-defined symbol would have its own versioning marker for example. Each logic file can be written to include place holder markers for incomplete instructions in support of "dynamic pseudo code". Furthermore, dependencies on external parts can be encoded into the mediation code, including specific version information of those files.

In this controlled file format, multiple version deltas could be maintained within the same file, simplifying version comparisons and the ability to support pending changes in dependent interfaces. When an interface is "committed" to a programming environment, that is, made available for general use, then any change to that public interface, whether it's a symbolic name, signature change, return code value, etc. would be considered a deprecation, an incompatible update.

In other embodiments, a user can input commentary into lines of code using the GUI structured editor. The GUI structured editor can, responsive to receiving user input, tag various lines or various categories, such as an overall method or overall class and would be indexed as a separate entity within the file to facilitate the various viewing preferences of the GUI structured editor. In some cases that commentary might be stored separately because it is a different media such as audio, visual, or video format, or because it centralizes an explanation that applies to more than one file. In this embodiment, commentary could also be included to describe the history of the change delta. In instances where the GUI structured editor is used in an Integrated Development Environment (IDE) that supports this centralized form of mediation code, delta comparisons are presented in an easier to process format since the visual display is controlled by GUI dialogs and not lines of source code. In this embodiment, changes in history can be exact, for example, with regard to symbol name changes, signature changes, line changes, regarding additions, changes, and deletions. The version field at each encoded instruction would help make this granular level of comparison possible.

In instances where a user desires that the encoded program alternatively use a traditional compiler or to provide source code separately, the GUI structured editor could use the mediation code to export traditional text-based source as a snapshot. Similarly, the GUI structured editor could import existing source code in traditional text format.

Accordingly, the mediation code as described above would provide a more efficient file size compared to traditional text-based source code and provide excellent life cycle management characteristics with regard to its code delta management. For example, the GUI structured editor avoids formatting incompatibilities that could exist in traditional source code, and helps manage dependencies and re-versioning better. The GUI structured editor also includes the option to generate dual-pathed objected code.

As previously discussed with regard to FIGS. 6A-D, the GUI structured editor can present symbols (e.g., in the form of graphical icons) that, when selected by a user and received by the GUI structured editor, can be used to generate source code that, when fed into a compiler, is identical. The following discussion is made with intent to give other examples of symbols and or graphical icons that may be used to represent Java syntax.

In one example, curly brackets that denote code blocks can be replaced with a symbol (e.g., a graphical box) while still keeping the text syntax. Thus, in contrast to traditional source code, indentation of imbedded code blocks need not be as pronounced because the lines of the box denote level of grouping. In another embodiment, the graphical box can be shaded to different color hues.

In another example, conditions of each block can be represented as a header to the box, where the initial icon can be clicked/pressed to toggle the folding in and out of view the rest of the box which is the code block body. An "if" keyword could be represented by a symbol of a graphical "?". A symbol of a "swirl" could be used to denote a "for" loop. Multi-directional arrow symbols can denote a "switch". The "switch" block could be depicted as a table, with each "case" as an entry, using a checked box icon whose code block could be folded as a lower level block.

The "." symbol which is used to associate an object with an invoked method, or alternatively, a class with a static class method could be replaced by a larger graphical equivalent that is centered regarding the height of the line. In some instances, the GUI structured editor can associate a different user-defined graphical symbol with a class, an object reference to that class, a method, field, or constant.

In instances where other languages are used, the GUI structured editor could use a graphical icon such as an actual arrow to denote pointer de-referencing instead of the conventional "→".

In another example, the GUI structured editor can display a "speech bubble" symbol that points back to the method being invoked instead of the traditional parenthesis in parameter lists. A triangular graphical icon displayed with the speech bubble could be selected by a user (e.g., via clicking a mouse, pressing the triangle on a touch screen display, etc.) to display a folded in and out view of the parameter list.

In other instances, the use of a triangular graphical icon can be used to toggle different views of nested code blocks above, nested method invocations, nested parenthesis in overriding hierarchy of operations, etc. For example, the GUI structured editor can assign one or more graphical icons to "fold in or out" of source code view. Commentary need not be in text form. It could be in various forms of media, such as an image, set of images, video, audio, or traditional text. Variants of the icon could denote the different forms of media. Commentary could be associated with a line, a code block, a method, a class, etc. and be tagged from the corresponding location in the presented view. Conversely, there could be a comments-only view. Instead of maintaining a separate, all-inclusive presentation on a code project, the diagrams and supporting media could be integrated into the code library, where change management would help keep all forms of commentary in synch with the changing code. Consider internal presentation material that typically covers "locks, blocks, & flows": the serialization, control blocks, and overall infrastructure of a project. Continuing the industry's trend of incorporating documentation of external interfaces into the code, there would be considerable benefit of the life cycle of the product to have internal documentation and supporting media in that central repository.

Accordingly, embodiments of the present invention can display graphical representations of programming language syntax. Responsive to receiving user selections of those graphical representations, embodiments of the present invention can generate syntactically correct source code without the use of a peripheral keyboard.

FIGS. 8A-D are example screenshots of the transition from a traditional, all-text source to a GUI structured editor display incorporating graphical icons, in accordance with an embodiment of the present invention.

Figure 8B:
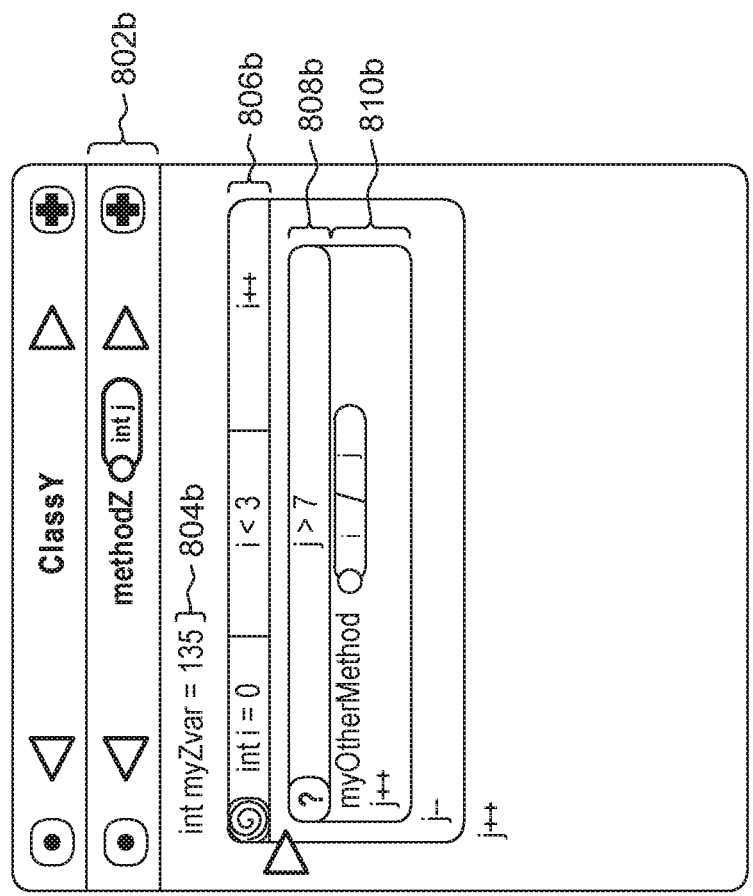
FIGS. 8A-D are example screenshots of the transition from a traditional, all-text source to a GUI structured editor display incorporating graphical icons, in accordance with an embodiment of the present invention.
Figure 8A:
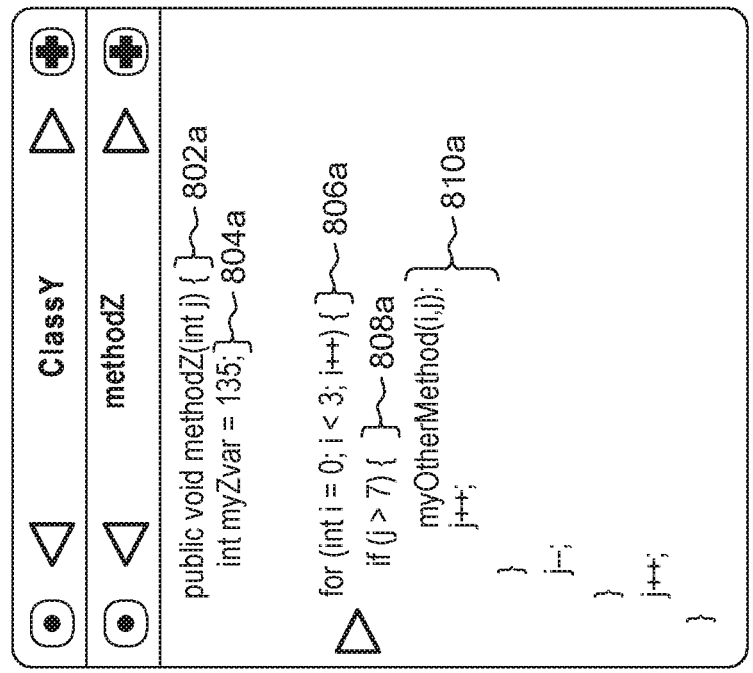

FIG. 8A is an example screenshot displaying a user interface with traditional all-text source code. In this example, line 802a is a method signature. Particularly, line 802a displays method Z, and the parameter for the method (e.g., int j). Line 804a displays a local data of type int (e.g., myZvar). Line 806a display a "for loop". Line 808a displays an "if" conditional. Lines 810a displays another method (e.g., myOtherMethod) with parameters "i" and "j".

FIG. 8B is an example screenshot displaying graphical icons that represent the all text view of FIG. 8A. For example, the method signature has moved into header 802b. In instances where a larger screen is available, a full signature can be displayed. Where a larger screen is unavailable, the GUI structured editor can shorten the method signature by further truncating the signature. Responsive to a user selection (e.g., selecting header 802b), the GUI structured editor could open a dialog box with the full signatures. In this embodiment, a user input can be on a touch screen where the user presses a finger in the center of header 802. In other embodiments a user can input a selection by any method known in the art.

In this example, the graphical representation of line 804a can be found in line 804b. The graphical representation of line 806a (e.g., the "for loop") is represented by header 806b. Line 806a (e.g., the "if" condition) is graphically represented by header 808b (e.g., vertical lines replace the semicolons of line 806a. Lines 810a is visually represented as box 810b (e.g., parameters "i" and "j" are graphically represented by a text bubble separated by a vertical line instead of an open and closed parenthesis, separated by a comma).

Figure 8D:
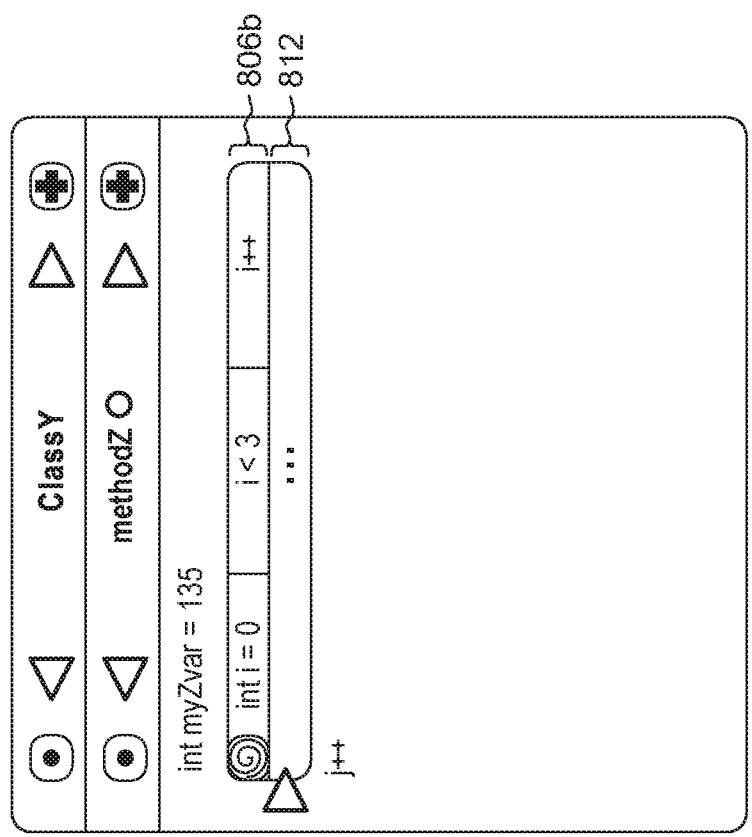
Figure 8C:
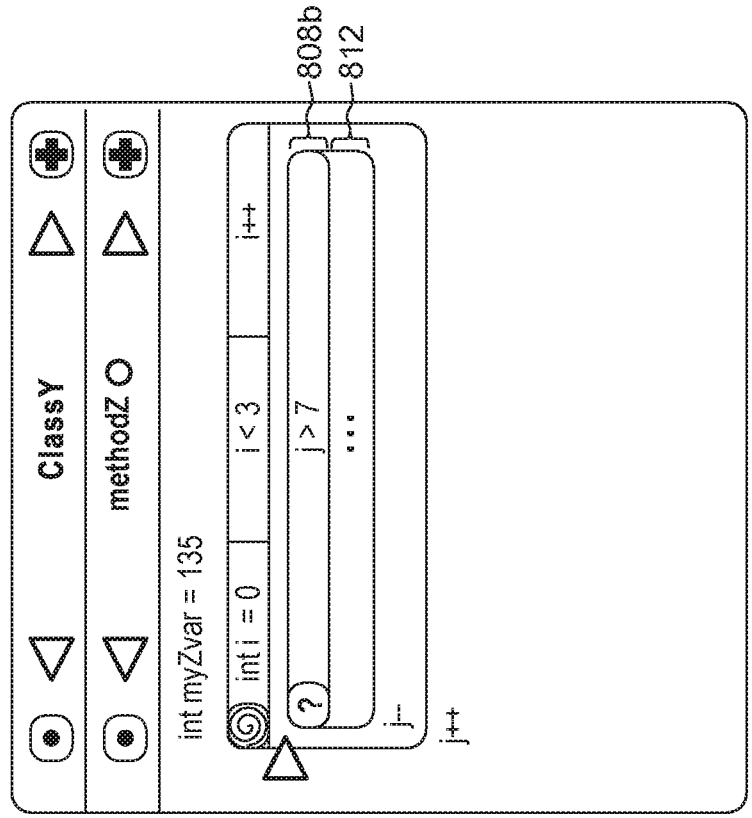

FIGS. 8C and 8D are example screenshots of cold folding, in accordance with an embodiment of the present invention. For example, the GUI structured editor can display " . . . " as a graphical icon that a user may select to switch between views. In other instances, similar graphical icons may be included to allow parameter lists to be folded.

In FIG. 8C, the GUI structured editor displays graphical icon 812 as a visual indication that a code block such as block 810b has been hidden. Responsive to receiving a user selection of graphical icon 812, the GUI structured editor can display block 810b or hide another block of code (e.g., header 808b). In this embodiment, a single tap of graphical icon 812 can display block 810b while a double tap of graphical icon 812 can hide header 808b. In other embodiments a user selection can be a click of a mouse. In this example, a user has chosen to select 812 in a manner that causes header 808b to be hidden from view. Responsive to receiving a user selection that causes header 808b to be hidden from view, the GUI structured editor can alter the display to hide header 808b.

In FIG. 8D, the GUI structured editor displays a graphical representation of modified source code. Specifically, FIG. 8D shows an example of code folding responsive to a receiving a user selection. In this example, the GUI structured editor has generated a visual display that has hidden headers 808b and 810b responsive to receiving user selections of FIGS. 8B and 8C. Similarly, in this embodiment, selecting graphical icon 812 can trigger an option to display block 808b or hide header 806b.

Accordingly, embodiments of the present invention can be used to graphically represent source code in a visual display that takes up less screen real-estate and is easy to read. Responsive to receiving user selections, embodiments of the present invention can generate and toggle between different views to expand or collapse blocks of source code (e.g., instructions within a particular method of a class).

FIGS. 9A-9D are additional example screenshots of graphical icons that can be displayed using a GUI structured editor, in accordance with an embodiment of the present invention.

FIG. 9A is an example screenshot showing a traditional textual source code. In this example, a method, denoted as "method Z" of type "char" is shown in line 902. A switch block with parameter "x" is depicted in line 904. Lines 906, and 912 denote two cases (e.g., case A and case B) of the switch block. Line 918 denotes a default. Lines 908 and line 910 are instructions for "CaseA". Lines 914 and 916 are instructions for "CaseB". Lines 920 and Lines 922 are instructions for "Default".

FIG. 9B is an example screenshot of graphical icons used to depict traditional textual source code using a GUI structured editor. In this example, a switch block (e.g., like switch block of FIG. 9A) is depicted using graphical icons.

For example, a switch block for character "x" (e.g., box 924) is depicted by icon 923. Icon 923 is a 3-row box icon representing a "switch". Icon 925 is a checked circle that represents that box 926 has been selected. Box 928 displays a method for case A (e.g., "doThis"). In this example, box 928 does not have an additional icon (such as icon 939) that would indicate additional parameters. Icon 929 is a star and is used to represent a break.

Box 930 represents a different case (e.g., Case B). Box 932 displays a method for Case B (e.g., "doThat"). Icon 931 is a checked circle that represents that box 930 has been selected. Icon 933 is a cursor icon. In this example, the cursor icon is a triangle. Icon 934 is a star which is used to denote a break.

Box 936 represents another case (e.g., default). Box 938 displays a method (e.g., "doOtherThing") for the default case. Icon 935 is a checked circle that represents that box 936 has been selected. Icon 939 is a circle that indicates that denotes a parameter list which can be unfolded if necessary. Icon 937 is a star which is used to denote a break.

Figure 9D:
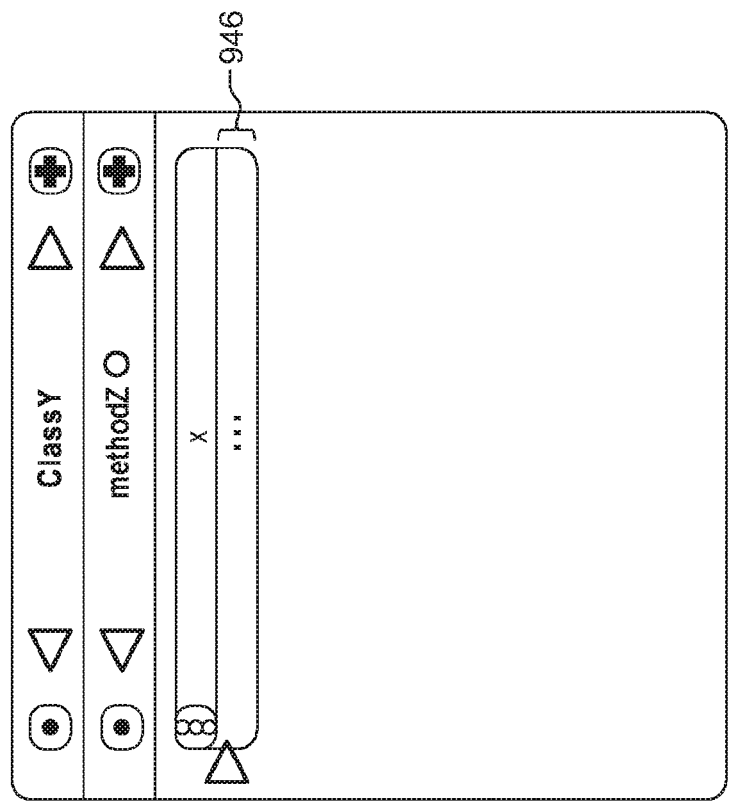
Figure 9C:
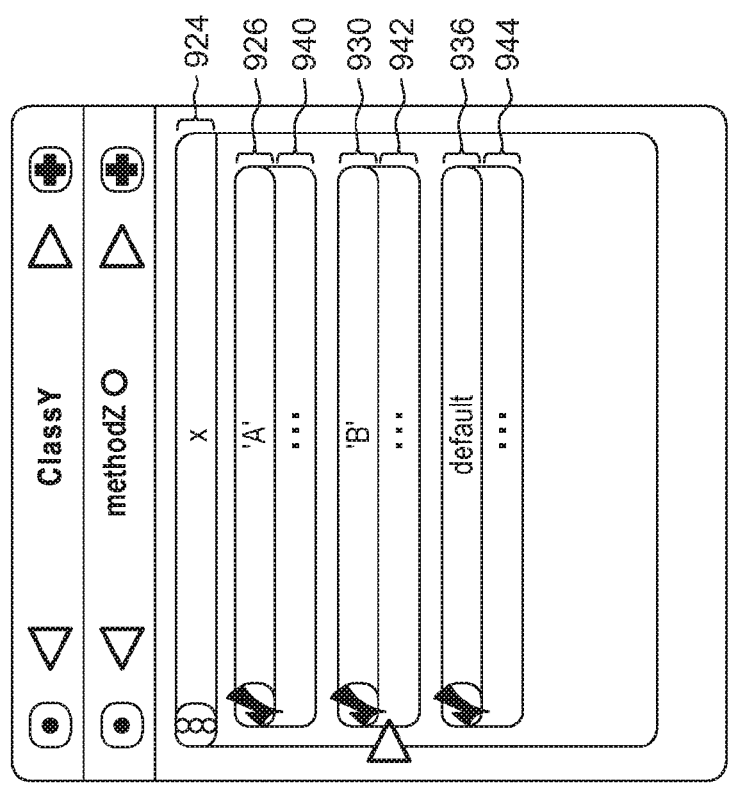

FIG. 9C is an example screenshot that shows how a first level of code folding can still show the switch variables and the list of cases. The term "code folding", as used herein (also referred to as level grouping), refers to a graphic representation of modified source code organized by different levels (e.g., nested parameters). In other words, code folding refers to a visual representation of modified source code that displays headings of instructions without displaying the instructions themselves.

In this example, icons 940, 942, and 944 are depicted as ellipses (e.g., "..."). In this example, icons 940, 942, and 944 can toggle between displays responsive to a user selecting one or more of icons 940, 942, and 944. For example, responsive to a receiving a user selection of an icon (e.g., icon 940, 942, or 944), the GUI structured editor can display additional information (e.g., methods 928, 932, and 938, not shown).

FIG. 9D is an example screenshot that shows a second level of code folding. In this example, icon 946 is depicted as an ellipses. Responsive to a user selecting icon 946, the GUI structured editor can display boxes 926, 930, and 936 (not shown) as well as icons 940, 942, and 944 (also not shown).

Accordingly, in this embodiment, the GUI structured editor can take traditional, textual source code and incorporate graphical icons that would free up screen real estate.

In another embodiment, the GUI structured editor can aid at runtime debugging. For example, in an integrated development environment (IDE), a debugging program option of the GUI structured editor can leverage the code folding feature provided by the GUI structured editor. Specifically, the debugging environment can provide options to break at various levels of code blocks generated by the GUI structured editor (e.g., the code folding generated in FIGS. 9A-D).

Typically, a method known as "step tracing" is performed (i.e., code is reviewed one line at a time). A "hit", as used herein, refers to a point (i.e., line of code) reached during execution of a program that has a specified "break". A debugger option of the GUI structured editor can pause the execution of the program allowing a user to check that status of variables and/or make changes to the line of code.

For example, a user can select a breakpoint option to stop at the beginning of every method within a class. After one hit (i.e., when a debugger program reaches a line of code at a user-defined break), the GUI structured editor can present an option to break at every sequential instruction. In other words, the GUI structured editor can present an option to break at different levels of code (i.e., code blocks) as shown and described in FIGS. 9A-9D. The option to break could be lifted at any spot to make the breakpoint hits restricted to a few manually set locations in the code. Providing the option to break at the top of code blocks that are one, two, or more levels deep would provide an extended granularity to method-level breakpoints. The break options might be set after a particular method was hit for example. Pseudocode and code commentary often describe the first one or two levels of blocks to overview functionality. Functionality would still be achieved regardless of whether the block is from a conditional, a switch table, a loop, etc. In this embodiment, the views generated by the GUI structured editor can aid in high-level step tracing because the GUI structured editor can show folded code at various levels of grouping.

The GUI structured editor can, through the use of its code folding feature free up screen real estate in a debugging scenario. For example, code folding of the view could initially sync up with the debugger program's configuration option for the code block levels receiving breakpoints. In instances where the option is a single level deep, the GUI structured editor can generate a display view that initially hides all code blocks, simply showing the conditional or loop that determines it. Where the option is two levels deep, then the GUI structured editor's debugger program can show the code within each first level of code blocks, but hide code blocks imbedded within them, etc.

The debugger program can have the option to open up different levels of the code blocks at each stop, and even to set the corresponding breakpoints for the next level of statements within that block with a single GUI button. In cases of multiple layers of imbedded code blocks, there can be clear visual advantages to folding the code blocks until the user decides to trace inside them. Another button can be displayed and responsive to a user selecting the button, the debugger program can remove the various sets of breakpoints at some future stop.

The option to unfold the corresponding assembler or machine code could be done in synch with breakpoints, or be kept separate. Run-time debugging could be optionally done at the assembler instruction level with specific register/storage operand values for example, or static snapshots of dumped storage could be similarly interpreted. Portions of source code can be filtered to show the assembler or machine code of interest to the debugger. The debugger program can utilize a GUI display similar to the GUI structured editor display to switch to or pop-up a corresponding view of the data responsive to a user selection. In a run-time debugging environment, this could alternatively create a monitor of that data. The debugger can, optionally, use a pop-up or a monitor for a high-level variable or the corresponding register/storage operand.

In instances where automated test cases are used, the breakpoint technology described above can be leveraged to ensure a certain code path is taken. Combinations of breakpoints could optionally be stored as independent manual test configurations. In addition to a set of automated test cases, the debugger may want to maintain a documented set of manual ones with a stored, consistent set of breakpoints to repeat the test. These debugging scenarios could be saved by the IDE and rerun with the touch of a button.

The notion of a user preference of code block nesting levels would extend well into debugging activities, either run-time or from snapshot dumps. The GUI structured editor display outputs could be leveraged and would extend the capability of mobile-based programming to debugging in its minimizing of screen real estate. The display outputs (e.g., the graphical representation of modified source code organized into easy to view groupings) would provide high level view of the code that could extend into breakpoint settings, including saved settings for automated regression testing. Finally, the GUI structured editor would also allow the debugger to focus on areas of interest within the listing, such as selectively displaying portions of assembler or machine code for the problem area.

Accordingly, leveraging the code blocks generated by the GUI structured editor regardless of whether or not the programming language is dependent on indentation can provide a more granular extension to breaking at the beginning of each method. Providing increased granularity can save developers time and complement existing the existing source code view that may already utilize code folding.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product comprising:
   one or more computer readable storage media and program instructions stored on the one or more computer readable storage media, the program instructions comprising:
      program instructions to receive one or more symbols indicating tasks to be implemented via source code;
      program instructions to generate a visual display comprising a dialog box supporting modification of source code that implements the executable instructions indicated by the one or more symbols;
      program instructions to, responsive to receiving a user interaction with the dialog box resulting in modified source code, generate a visual display comprising a dialog box output, wherein the dialog box output is one of the modified source code or a representation of the modified source code that is shorter than the modified source code;
      program instructions to provide an opportunity to toggle the generated visual display between displaying the modified source code and the representation of the modified source code that is shorter than the modified source code, wherein the representation of the modified source code that is shorter than the modified source code includes the one or more symbols;
      program instructions to, responsive to receiving a modification of the one or more symbols included in the displayed representation of the modified source code that is shorter than the modified source code, update all instances of source code corresponding to the one or more symbols;
      program instructions to, responsive to receiving the modification of the one or more symbols included in the displayed representation of the modified source code that is shorter than the modified source code, store a first delta value associated with a first modification of the one or more symbols and a second delta value associated with a second modification of the one or more symbols, wherein the first delta value and the second delta value each correspond to a different view of the respective first and second modifications;
      program instructions to, responsive to receiving a query for the first delta value, display the view associated with the first delta value;
      program instructions to, responsive to receiving a query for the second delta value, display the view associated with the second delta value;
      program instructions to provide an option to generate multi-pathed object code with the utilization of the first and second delta values; and
      program instructions to provide an option to debug the modified source code, wherein the option to debug the source code pauses execution of the source code according to instruction headings;
   responsive to receiving a query for the first delta value, displaying, by one or more computer processors, the view associated with the first delta value;
   providing, by one or more computer processors, an option to generate multi-pathed object code with the utilization of the first and second delta values; and
   providing, by one or more computer processors, an option to debug the modified source code, wherein the option to debug the source code pauses execution of the source code according to the instruction headings.

* * * * *